US010639728B2

(12) United States Patent
Hashikawa et al.

(10) Patent No.: US 10,639,728 B2
(45) Date of Patent: May 5, 2020

(54) DISPOSING DEVICE OF SHAFT-BODY INSERTION OBJECTS

(71) Applicant: JDC, inc., Sasebo-shi, Nagasaki (JP)

(72) Inventors: Naoto Hashikawa, Sasebo (JP); Takuro Hori, Sasebo (JP)

(73) Assignee: JDC, inc., Sasebo-shi, Nagasaki (JP)

( * ) Notice: Subject to any disclaimer, the term of this patent is extended or adjusted under 35 U.S.C. 154(b) by 597 days.

(21) Appl. No.: 15/305,716

(22) PCT Filed: Apr. 19, 2016

(86) PCT No.: PCT/JP2016/062440
§ 371 (c)(1),
(2) Date: Oct. 21, 2016

(87) PCT Pub. No.: WO2017/183120
PCT Pub. Date: Oct. 26, 2017

(65) Prior Publication Data
US 2018/0141137 A1 May 24, 2018

(51) Int. Cl.
B23D 35/00 (2006.01)
B26D 7/26 (2006.01)
(Continued)

(52) U.S. Cl.
CPC ........... *B23D 35/001* (2013.01); *B23D 19/06* (2013.01); *B23D 35/004* (2013.01);
(Continued)

(58) Field of Classification Search
CPC ............... Y10T 83/783; Y10T 83/7826; Y10T 83/7822; Y10T 83/7834; Y10T 83/7843;
(Continued)

(56) References Cited

U.S. PATENT DOCUMENTS 3,951,024 A * 4/1976 Weiskopf ............. B26D 7/2621
83/498
4,006,671 A * 2/1977 Ochs .................... B26D 7/2621
493/474
(Continued)

FOREIGN PATENT DOCUMENTS

EP 2 974 836 A1 1/2016
JP S51-000583 U 1/1976
(Continued)

Primary Examiner — Laura M Lee
(74) Attorney, Agent, or Firm — Amster, Rothstein & Ebenstein LLP

(57) ABSTRACT

A separator disposing portion 15 is provided with a ball screw 22 and an arm 23. The arm 23 is a member which comes into contact with a holder 17 and a separator disk 18, thereby allowing them to move. The arm 23 is provided with a chuck portion 30 which is connected to a piston 29 and can be fitted to a chuck pedestal 27. The chuck portion 30 comes close to or moves away from an expansion/contraction shaft 16 in association with expansion and contraction of the piston 29. Further, the chuck portion 30 comes into contact with an outer circumference surface of the holder 17, a side surface of the holder 17 and a side surface of the separator disk 18 in association with movements of the piston 29 and a driving portion 26.

15 Claims, 11 Drawing Sheets

(51) Int. Cl.
  *B23D 19/06* (2006.01)
  *B26D 1/24* (2006.01)

(52) U.S. Cl.
  CPC ............ *B23D 35/007* (2013.01); *B26D 1/245* (2013.01); *B26D 7/2635* (2013.01); *B26D 2007/2657* (2013.01); *B65H 2301/41482* (2013.01); *G05B 2219/41249* (2013.01); *Y10T 83/7826* (2015.04); *Y10T 83/7847* (2015.04); *Y10T 83/9377* (2015.04)

(58) Field of Classification Search
  CPC ............ Y10T 83/7751; Y10T 83/7838; Y10T 83/7797; Y10T 83/7847; Y10T 83/659; Y10T 83/7876; Y10T 83/8745; Y10T 83/8746; Y10T 83/4838; Y10T 83/483; Y10T 83/4833; Y10T 83/4836; B23D 35/001; B23D 35/004; B23D 35/007; B23D 19/06; B23D 35/005; B26D 1/20; B26D 1/25; B26D 1/2055; B26D 1/205; B26D 7/26; B26D 7/2657; B26D 7/2635
  USPC ....... 83/343–346, 498–504, 676, 508–508.2, 83/561–562, 507, 509
  See application file for complete search history.

(56) References Cited

U.S. PATENT DOCUMENTS

| | | | | |
|---|---|---|---|---|
| 4,026,176 A * | 5/1977 | Weiskopf | ............ | B26D 7/2621 83/502 |
| 4,732,083 A * | 3/1988 | Arter | ................... | B26D 7/2621 101/226 |
| 4,759,249 A * | 7/1988 | Held | ................... | B26D 7/2635 83/425.4 |
| 4,926,730 A * | 5/1990 | Garrett | ................. | B26D 7/0006 384/620 |
| 5,188,012 A * | 2/1993 | Emich | .................. | B26D 7/2621 83/496 |
| 5,297,464 A * | 3/1994 | Mayer | .................. | B26D 7/2621 83/425.4 |
| 5,378,221 A * | 1/1995 | Lauderbaugh | ....... | B26D 7/2635 493/354 |
| 5,423,240 A * | 6/1995 | DeTorre | ............... | B23D 35/001 30/350 |
| 5,803,399 A | 9/1998 | Hashikawa | | |
| 5,979,282 A * | 11/1999 | Schlatter | ................ | B26D 1/245 188/356 |
| 6,012,372 A * | 1/2000 | Laster | .................... | B27B 5/325 83/504 |
| 6,286,404 B1 | 9/2001 | Miglietta | | |
| 9,457,488 B2 * | 10/2016 | Yamada | .................. | B26F 1/384 |
| 2003/0209115 A1 * | 11/2003 | Burkart | ................ | B26D 7/2635 83/13 |
| 2004/0173069 A1 * | 9/2004 | Shoudai | ............... | B26D 1/0006 83/13 |

FOREIGN PATENT DOCUMENTS

| | | |
|---|---|---|
| JP | H06-027091 U | 4/1994 |
| JP | H10-156654 A | 6/1998 |
| JP | H11-028515 A | 2/1999 |
| JP | 2002-239832 A | 8/2002 |
| JP | 2004-160560 A | 6/2004 |

* cited by examiner

[Fig. 1]
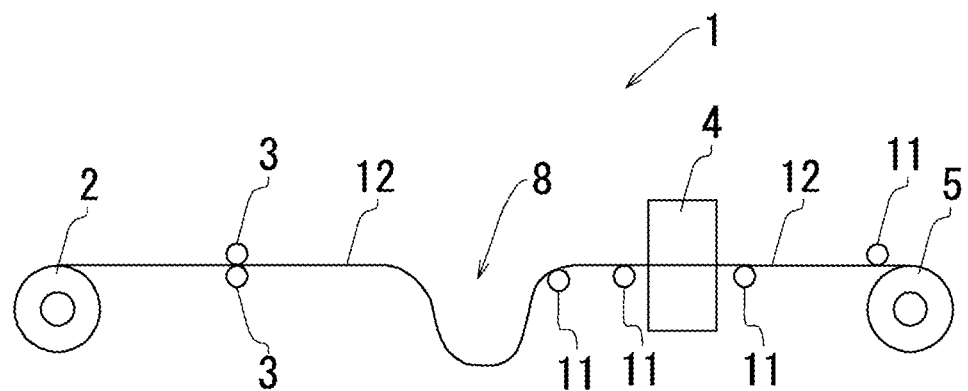
[Fig. 2]
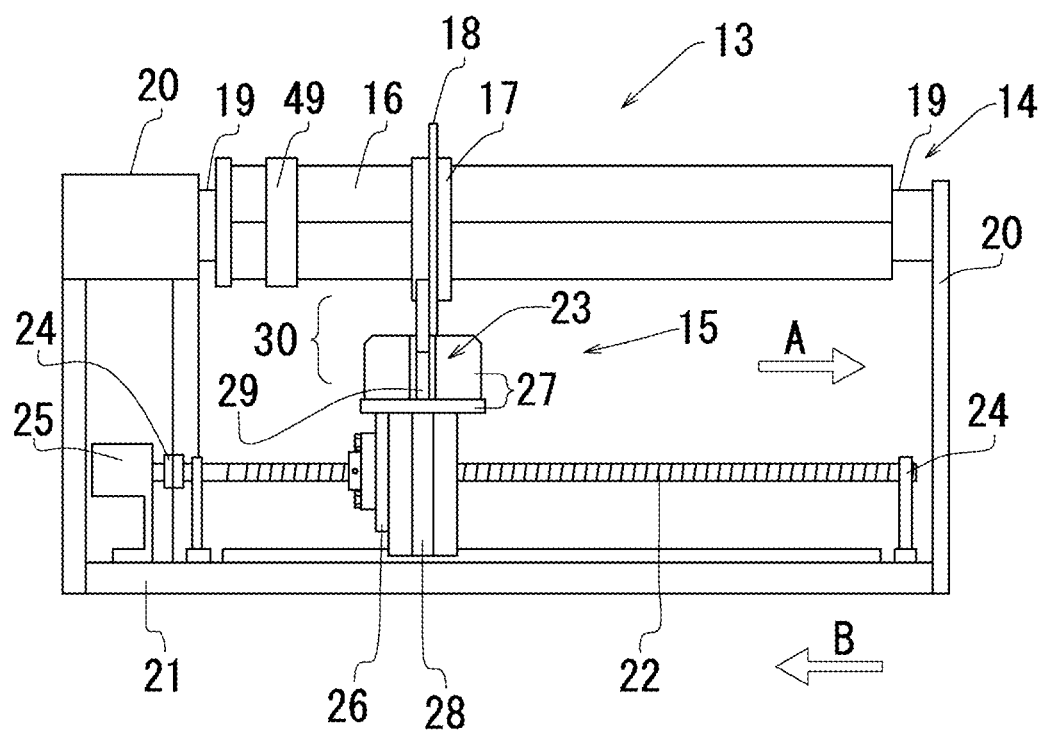

[Fig. 3]
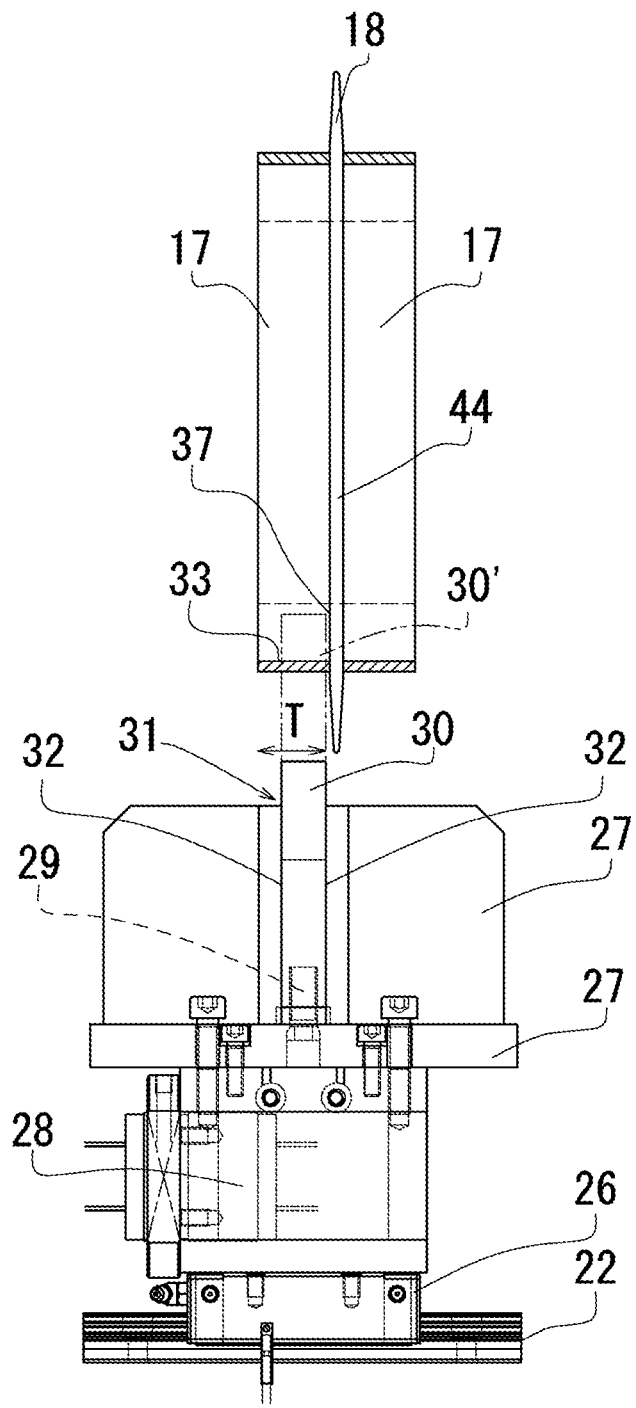

[Fig. 4]
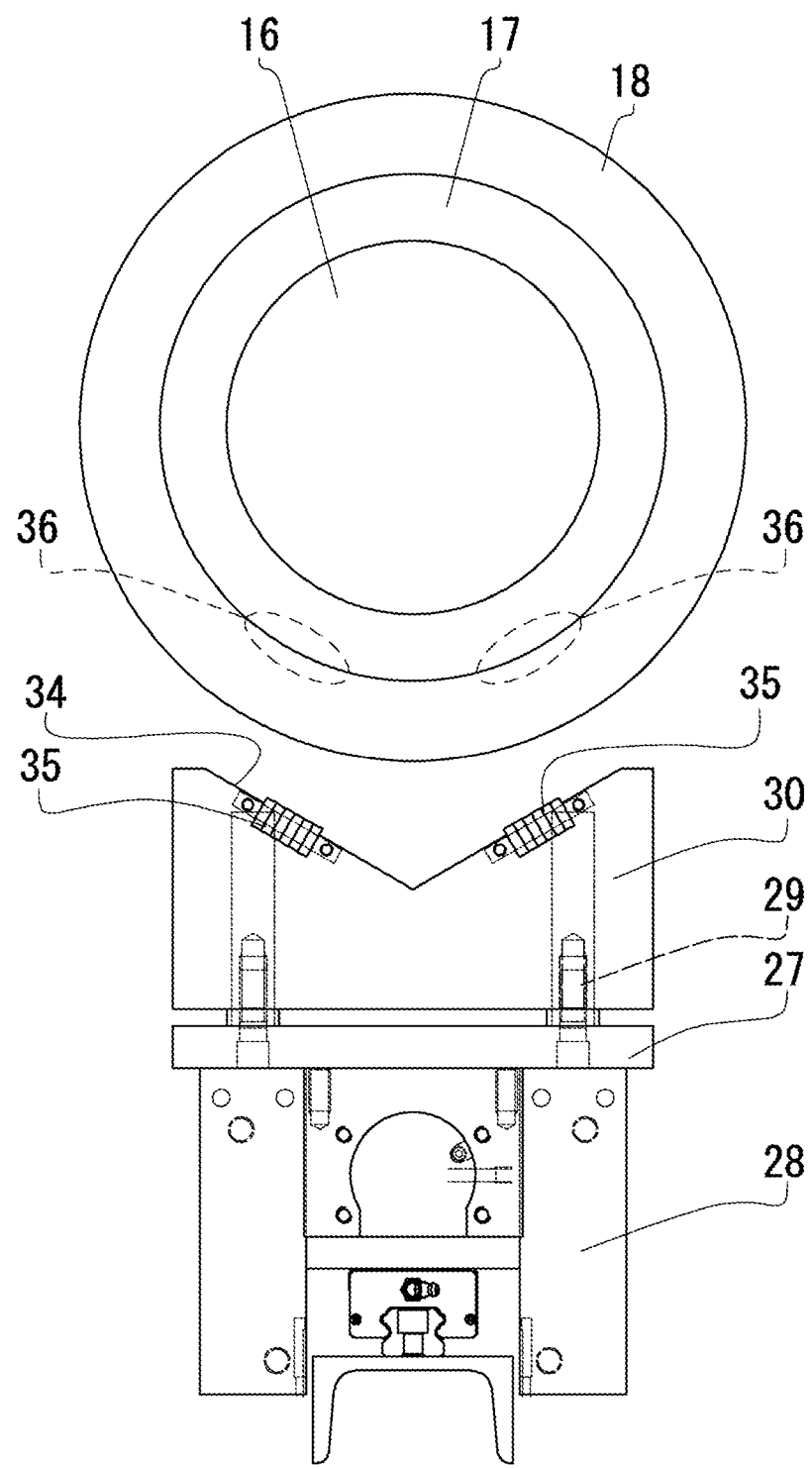

[Fig. 5]
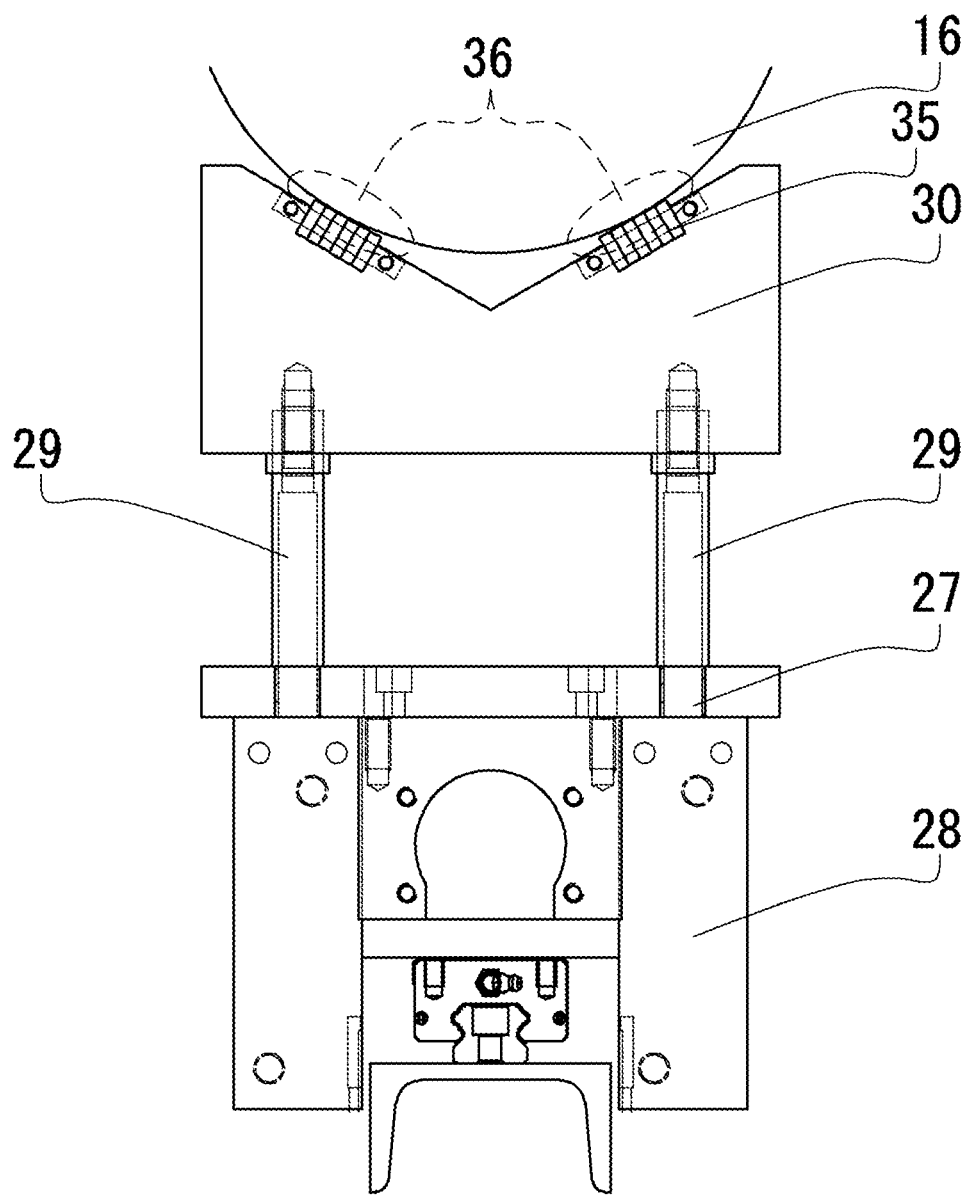

[Fig. 6]
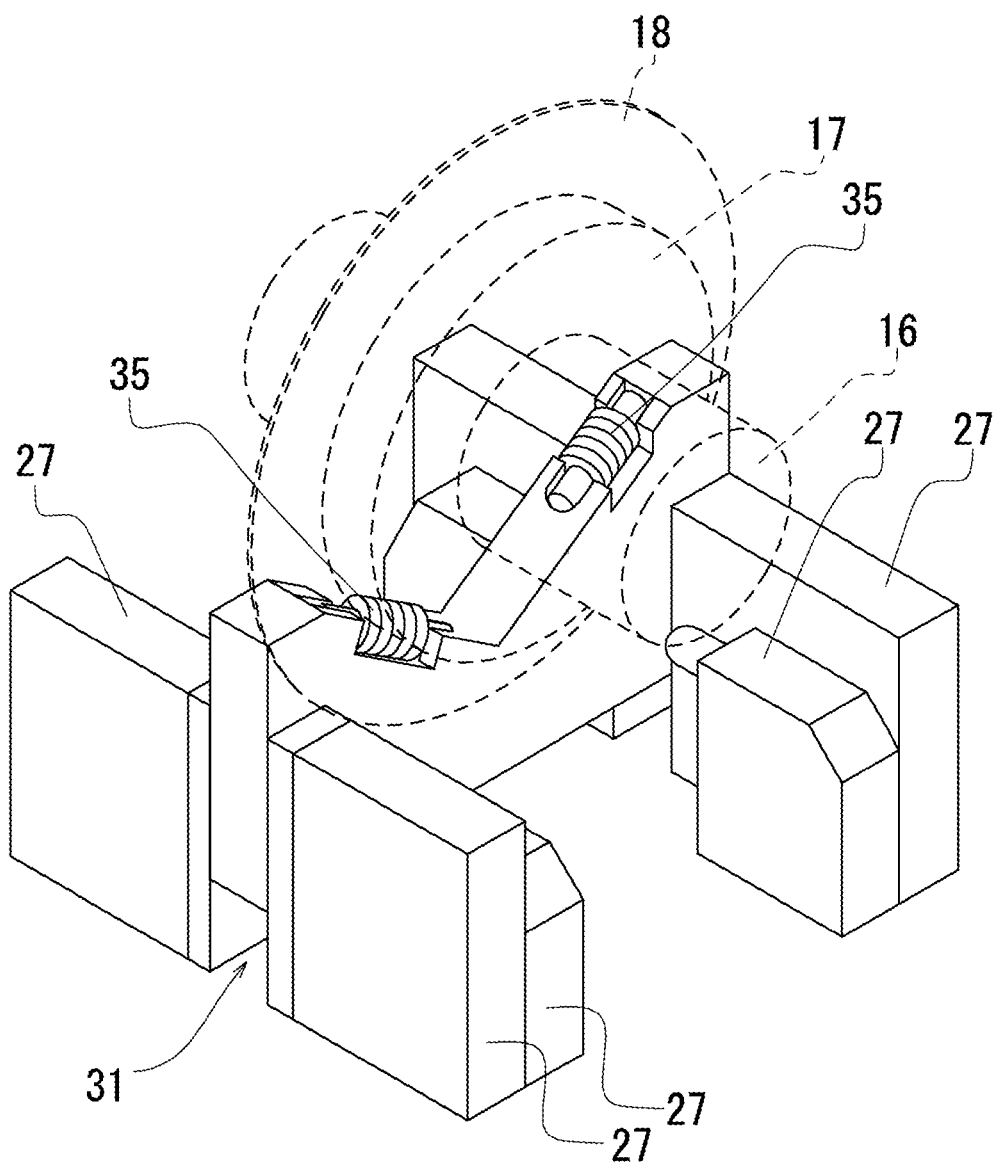

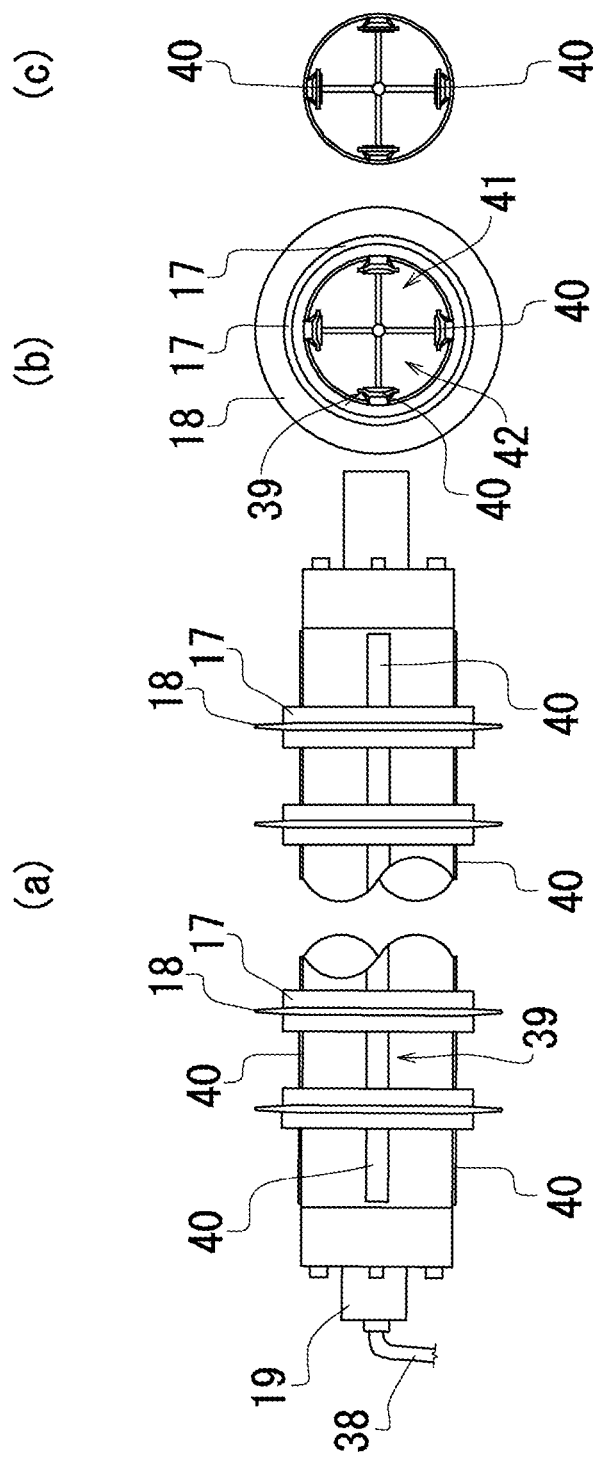

[Fig. 8]
(a) 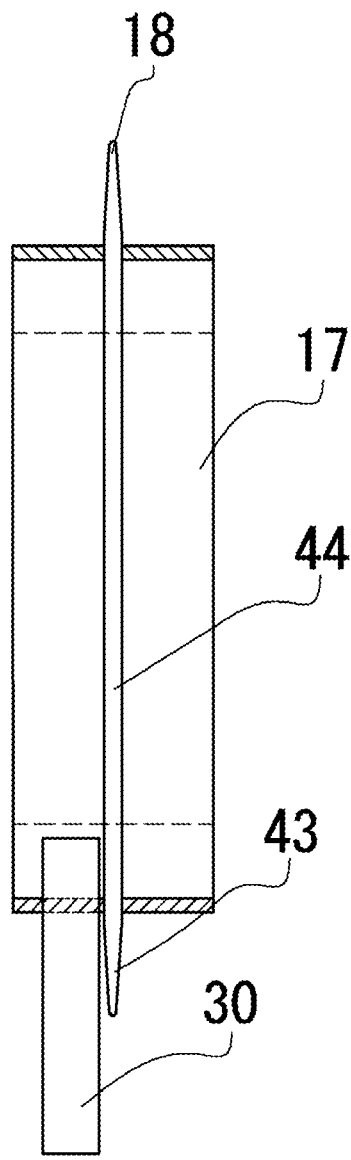
(b) 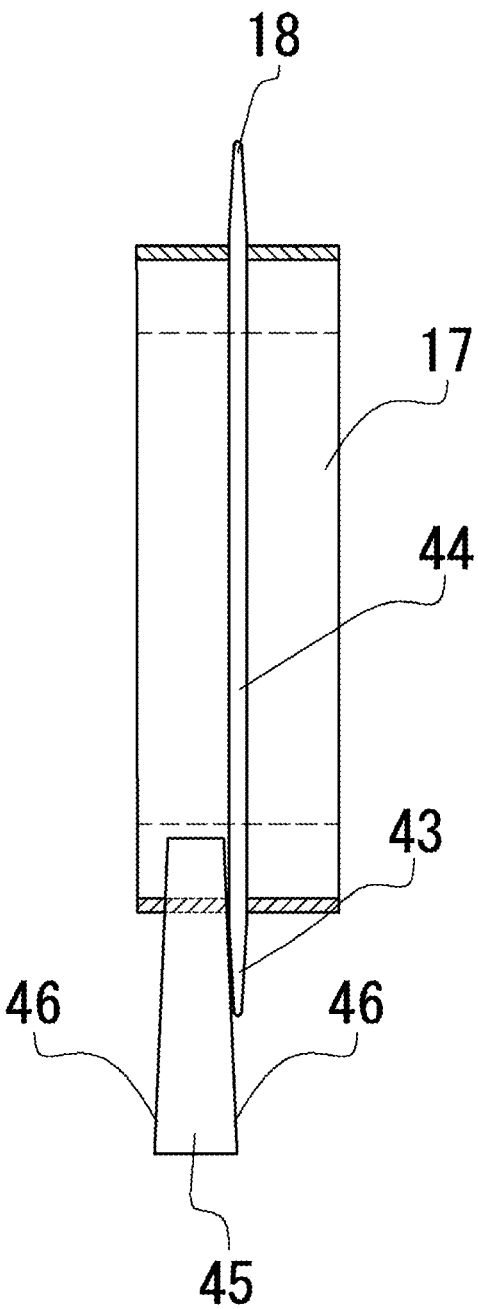

[Fig. 9]
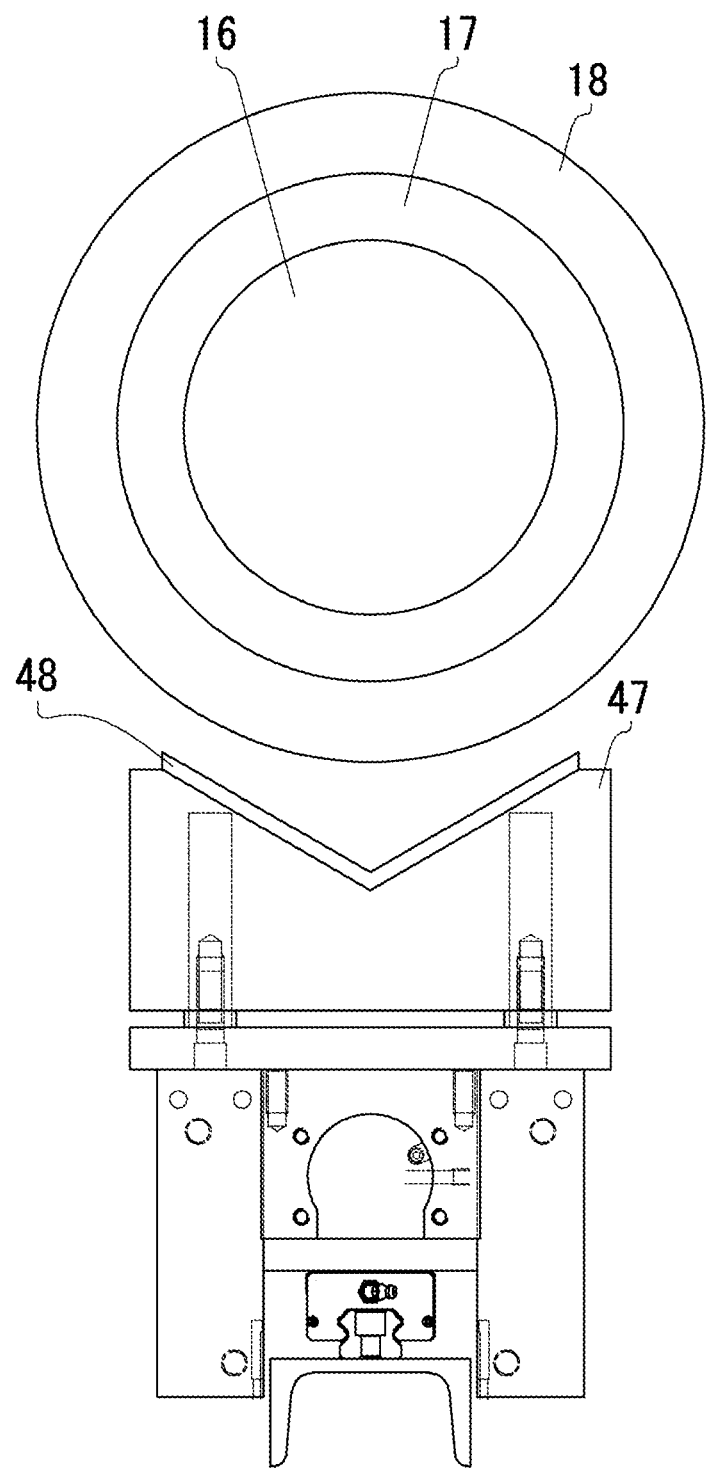

[Fig. 10]
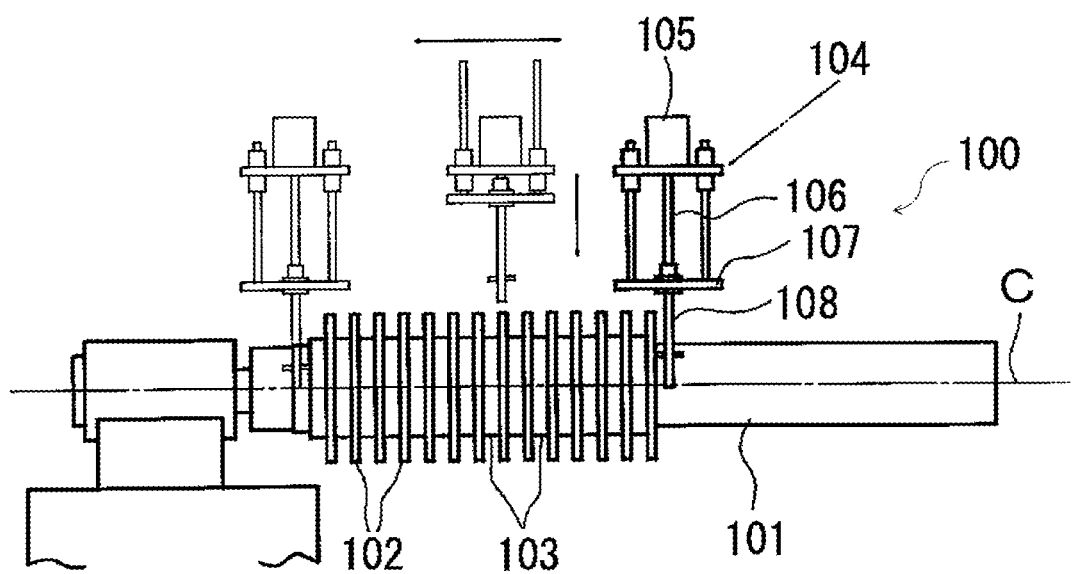

[Fig. 11]
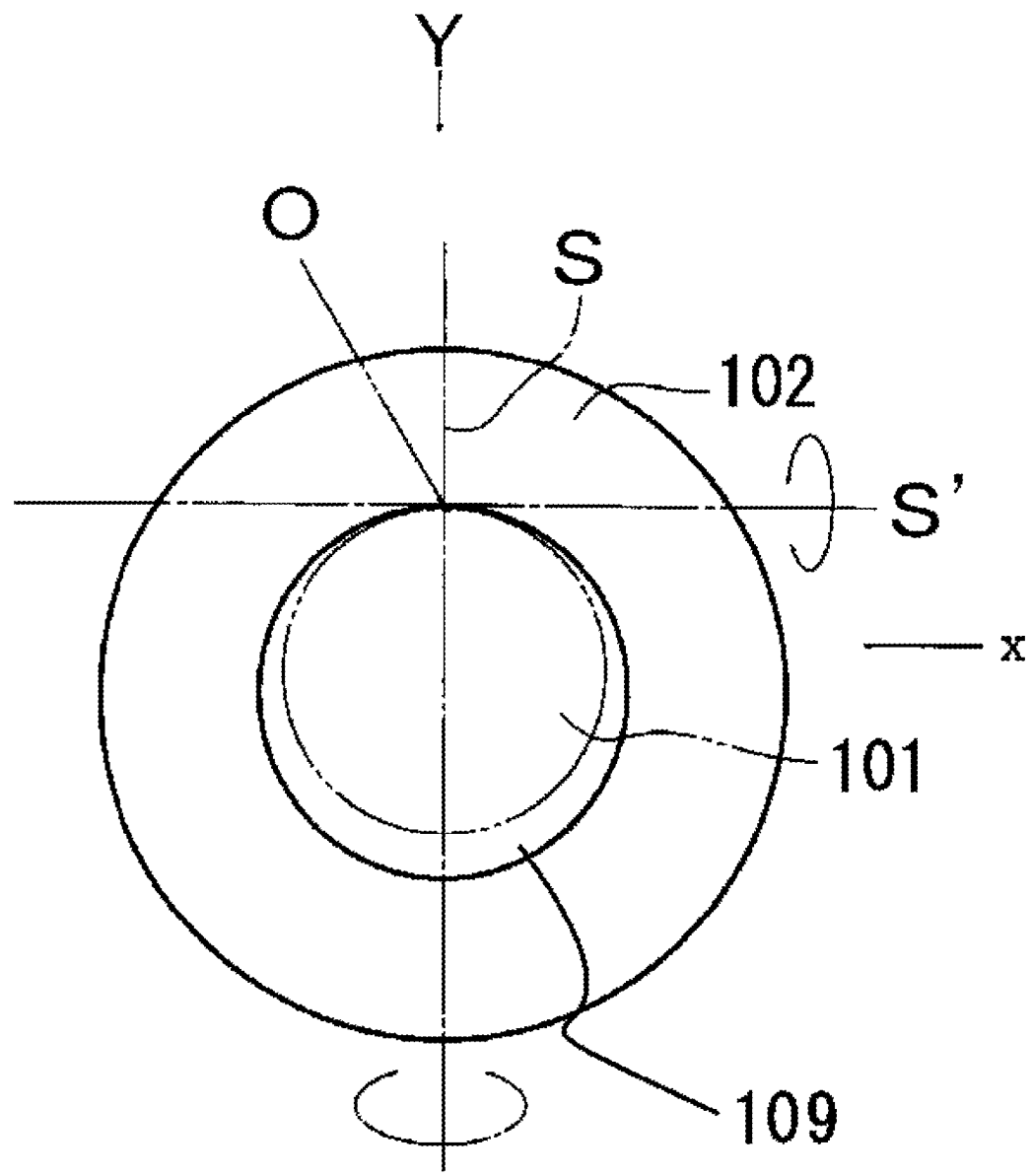

[Fig. 12]
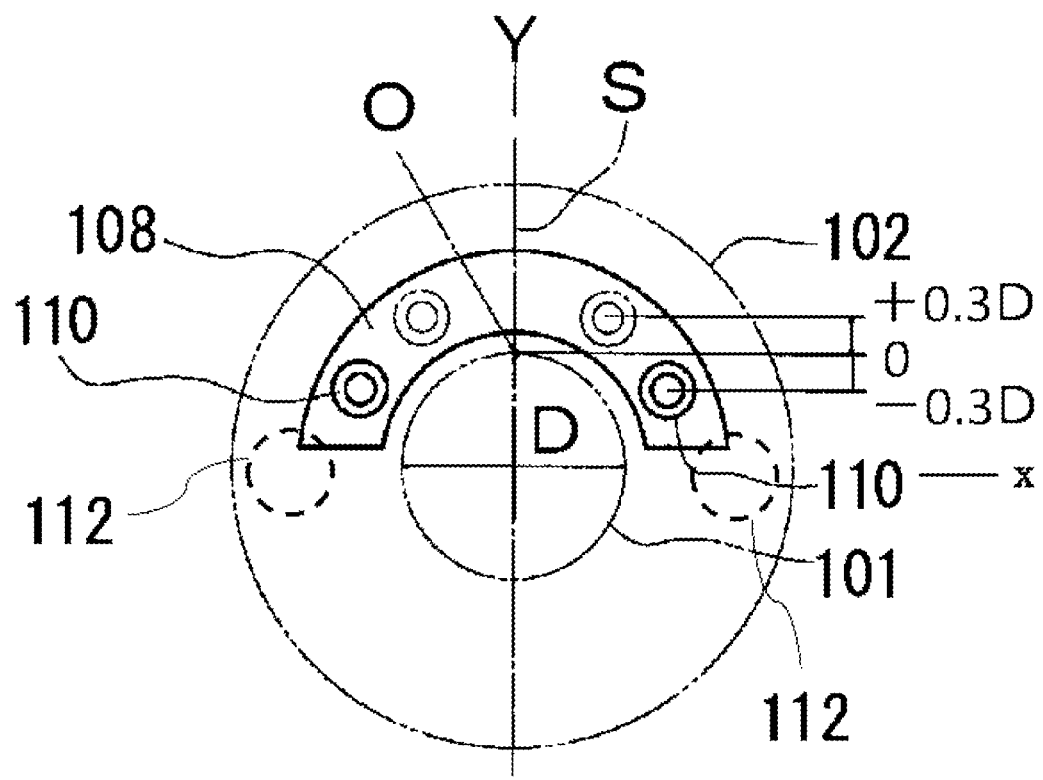
(a)
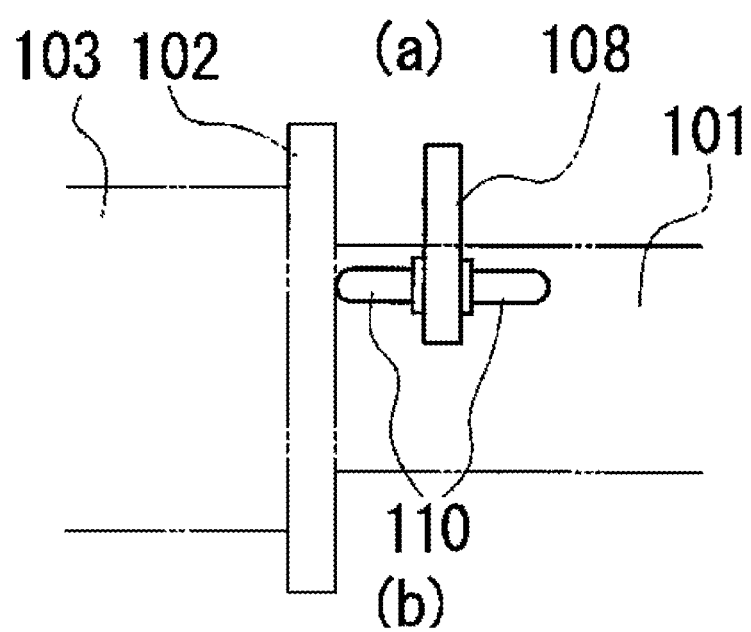
(b)

DISPOSING DEVICE OF SHAFT-BODY INSERTION OBJECTS

CROSS REFERENCE TO RELATED APPLICATIONS

This patent application is a U.S. national stage application under 35 U.S.C. t□t71 of International Patent Application No. PCT/JP2016/062440 filed on Apr. 19, 2016.

TECHNICAL FIELD

The present invention relates to a disposing device of shaft-body insertion objects. Specifically, the present invention relates to a disposing device of shaft-body insertion objects capable of disposing at a desired position of a shaft body efficiently and stably shaft-body insertion objects such as a movable disk of a separator and a blade of a slitter used in a slitter line and also excellent in attachability in the slitter line.

BACKGROUND ART

There is used a slitter line in which a long and wide sheet-like metal plate is cut continuously into a plurality of strips along a longitudinal direction to be made into wound multiple strips at the same time. The metal plate is cut into a predetermined width depending on an application of a metal coil. And, in some cases, more than ten strips may be produced from one sheet of the plate.

In a slitter line, a metal plate is subjected to slitting and formed into multiple strips and, thereafter, the strips are wound by a winder. In this instance, a winding-tension imparting device installed before the winder imparts a winding tension to the strips so that the strips are tightly and securely wound, around a winding coil.

On the slitter line, there is disposed a member which is called a separator for preventing a strip cut to a desired width from being in contact with an adjacent strip. The separator prevents a strip from being in contact with a strip adjacent thereto flowing on the slitter line, thereby contributing to stable threading of strips. The separator also prevents a strip edge from being damaged or bent, thereby playing a role of maintaining the quality of the strips after processing.

The separator is constituted with a plurality of movable disks, each of which is formed by integrating a cylindrical holder with an approximately doughnut-shaped separator disk and fixed on an outer circumference surface of a shaft having a certain length. A strip flows between the fixed movable disks, by which side surfaces of mutually adjacent strips do not come into contact with each other.

That is, when the separator is used, a distance between adjacent separator disks is set in accordance with the width of a strip. Although there exists a variety of fixed structures for a movable disk, in recent years, an air shaft method has been mainly used in which an outer circumference of a shaft is allowed to expand and contract, thereby fixing the movable disk.

Further, the holder plays a role in fixing the separator disk to the center of a shaft at a right angle and a role in preventing the bottom of a strip from being directly in contact with the shaft. The separator disk is a member which plays a role of a partition wall for strips to be threaded.

The separator is disposed, for example, at (after) a rise of a loop, before and after a winding-tension imparting device and before a recoiler in a slitter line. The separator partitions adjacent strips at these positions, thereby contributing to stable threading of the strips. The loop is a portion which absorbs sagging of a strip arising from the thickness of the strip. Further, the winding-tension imparting device is a device for imparting tension when strips are wound in a coil form by using the recoiler.

In the slitter line, there is also installed a cutter stand which has a slitter (cutter portion) for cutting a sheet-like metal plate into a metal strip with a predetermined width. The slitter is provided with a shaft having a blade which holds the metal plate from upper and lower sides, thereby cutting the plate into a metal strip.

The slitter to be used is structured so that a plurality of movable members, each of which is formed by integrating a cylindrical holder with an approximately doughnut-shaped round blade, as with the above-described movable disk, are fixed to a shaft with a certain length. There is also another slitter which is structured so that a member which is called a spacer is inserted between mutually adjacent round blades, thereby positioning the round blades.

A structure which fixes a blade to a shaft of a slitter is available in a variety of types. There is a hydraulic expansion/contraction shaft which allows an outer circumference of the shaft to expand and contract by hydraulic pressure, thereby fixing a holder and a round blade. Further, in the above-described structure in which the blade is positioned by using the spacer, such a structure is adopted in which an inner circumference of the spacer and that of the blade are made substantially equal to an outer circumference of a shaft, by which the spacer and the blade are inserted outside the shaft.

Here, in a slitter line, a strip to be processed is changed in width from several centimeters to more than one meter, depending on an application. That is, during one-day operation in the slitter line, it is necessary to process multiple types of strips different in width.

Where a strip to be processed is changed in width, the separator requires a change in the position of the movable disk according to the width of a corresponding strip. Also, in the slitter which is structured so as to fix a blade by using a hydraulic expansion/contraction shaft, it is necessary to change a position of the blade on the shaft. Further, in the slitter which is structured so as to use a spacer and a blade, it is necessary to perform additional work for removing the spacer and the blade from a shaft to attach a new combination of them.

In this instance, a plurality of movable disks and blades are disposed at equal intervals in accordance with the width of a strip. Work for disposing a movable disk and a blade on the shaft and work for pushing in and out a spacer and a blade were conducted manually in the past. Thus, frequent change in width of a strip seriously affected the efficiency of processing in a slitter line.

Under these circumstances, there is available a disposing device which is capable of automatically pushing a spacer and a blade in and out a shaft (shaft body) of a slitter. There has been proposed, for example, a device disclosed in Patent Literature 1.

As shown in FIG. 10, a device 100 disclosed in Patent Literature 1 is a device which disposes a blade 102 and a spacer 103 so as to be automatically pushed in and out a shaft 101 via a disposing device 104.

The disposing device 104 is constituted so as to move in parallel with the shaft 101 along a guide rail (not shown in the drawing). Further, the disposing device 104 is structured so that a lifting/lowering member 107 and a pusher 108 (pressing member) can expand and contract between the shaft 101 and the guide rail via a cylinder 105 and a piston 106. The disposing device 104 and the lifting/lowering member 107 are restricted respectively for horizontal movement and perpendicular movement by a servomotor (not shown in the drawing) and the cylinder 105.

Here, Patent Literature 1 has adopted the above-described structure in which an inner circumference of the spacer and that of the blade are made substantially equal to an outer circumference of the shaft, by which they are inserted outside the shaft, with a dimensional difference between them being about a few dozen micrometers.

Therefore, when the blade 102 is inserted outside the shaft 101, a clearance 109 develops, as shown in FIG. 11. Although an actual clearance found in the shaft to be used by the device 100 is about a few dozen micrometers, the clearance 109 is depicted in an enlarged manner for clearly showing its presence in FIG. 11.

Due to the presence of the clearance 109, when the pusher 108 allows the blade 102 to move by pushing a side surface thereof, such a problem has been posed that the blade 102 will get caught on the shaft 101 during movement and will not move any more.

Further, it is actually impossible that the pusher 108 pushes a side surface of the blade 102 with an even force at all plural sites every time when the pusher 108 comes into contact, thereby preventing the blade from getting caught on the shaft 101.

Thus, it has been estimated that in the device 100 disclosed in Patent Literature 1, loads of the blade 102 concentrate at an apex of an outer diameter part of the shaft 101 (the position of a load point O in FIG. 11) due to a difference in curvature between the shaft 101 and the blade 102. Then, it has been estimated that where the clearance 109 is present, the blade 102 sways more easily in a back and forth direction and in a lateral direction at the center of a load acting line S which passes through the load point O in the same direction as that at which its own weight acts and also at the center of a line S' which is orthogonal thereto at the load point O.

On the basis of the above-described estimation, in the device 100, as shown in FIG. 12 (a) and FIG. 12 (b), contact members 110 installed on the pusher 108 push the blade 102 in a state of point contact with a plurality of points on both sides of the load acting line S, thereby suppressing sway in the lateral direction, making the load point O as a fulcrum.

Further, in the device 100, a vertical position at a contact point is selected appropriately so that rotation moment around the contact point is made zero, thus making it possible to suppress the sway in the back and forth direction at the center of the load point O.

More specifically, as shown in FIG. 12 (a), a contact position at which the contact member 110 is in contact with blade 102 is placed within a range equal to ±0.3 times the diameter D of the shaft 101 on the side of an axis line C of the shaft 101 (refer to FIG. 10). That is, in the device 100, the blade 102 is pushed in a point-contact state in the horizontal direction at a site in the depth of ±0.3D in the Y direction in relation to the load point O.

As a result, in the device 100, moment which will sway the blade 102 in the back and forth direction is offset at the center of the contact point of the contact member 110 (that is, rotation moment at the contact point is made zero), thus making it possible to prevent the blade 102 from swaying in the back and forth direction.

According to the above-described constitution, the device 100 allows the blade 102 and the spacer 103 to move smoothly in a direction parallel to the axis line C of the shaft 101 (refer to FIG. 10).

Further, in addition to the device disclosed in Patent Literature 1, there is a disposing device which is capable of automatically disposing a movable disk at a predetermined position by a separator structured to fix the movable disk by an air shaft method.

As for the shaft and the movable disk which are handled by the disposing device, since the shaft is designed to expand and contract freely, an inner circumference of the movable disk (the holder and the separator disk) to be fitted thereinto is formed larger by 10 to 20% than an outer circumference of the shaft.

Therefore, when the movable disk is pushed for movement, the movable disk will easily get caught on the shaft due to a clearance between them. Thus, in the disposing device, a side surface of the separator disk which constitutes the movable disk is in surface contact with two points on the side surface thereof at a height position substantially at the center in a perpendicular direction (the positions indicated by the reference symbol 112 in FIG. 12 (a)).

That is, where the blade 102 shown in FIG. 12 (a) is supposed to be "a separator disk" of the movable disk, a contact portion of the disposing device is to push the positions indicated by the reference symbol 112. In this disposing device, the positions of the reference symbol 112 are each regarded as a position of the center of gravity on the movable disk, and the position of the center of gravity is pushed, thereby suppressing backlash on movement.

CITATION LIST

Patent Literatures

Patent Literature 1: Japanese Published Unexamined Patent Application No. 2002-239832
Patent Literature 2: Japanese Published Unexamined Patent Application No. H11-28515

SUMMARY OF THE INVENTION

Problems to be Solved by the Invention

Here, in the device disclosed in Patent Literature 1 and an existing disposing device of movable disks, there is a need for pushing a position of a blade slightly close to the center in the perpendicular direction, with a load point of the blade given as a reference, or a position of a separator disk at the center in the perpendicular direction. Accordingly, a long expansion/contraction stroke is needed in order that a contact member (pusher) comes to a target height position.

In particular, a disposing device which pushes the center of gravity of a separator disk (movable disk) (the central position in the perpendicular direction) is eventually provided with a long expansion/contraction stroke (about 30 cm to 40 cm) for covering the height of a standby position of a pressing member to the target height position on a side surface of the separator disk. Further, the device is provided with a large arm having a pressing member and solid in structure.

That is, the long expansion/contraction stroke is to be secured, by which it is made difficult to downsize the disposing device. The disposing device of movable disks is usually installed in the vicinity of a separator in a slitter line. Since it is impossible to downsize the disposing device, a shaft is required to be disposed above or obliquely below the separator, thereby restricting an installation site.

In particular, where the disposing device of movable disks is installed above the separator, there has been posed such a problem that an operator finds it difficult to visually confirm conditions of strips passing through the separator and flowing in a subsequent process, thereby the operator finding it difficult to confirm whether the strips are stably threaded or not.

Further, a long expansion/contraction stroke is needed for disposing one movable disk, thus resulting in longer time for completing disposing operation.

Further, because a pressing member is long in expansion/contraction stroke, a piston which undergoes expansion and contraction deflects easily. Therefore, there has been found a case in which even if a height position of the pressing member is strictly controlled by using a sensor, etc., "deviation" takes place in association with deflection of the piston, affecting a position at which a movable-disk is disposed.

Further, when an attempt is made to give a certain strength to the piston so that the piston will not undergo deflection, there is also a possibility that the device may have to be made larger in size.

Still further, there is no dimensional specification of a shaft or a movable disk. Shafts are different in diameter and movable disks are also different in size, depending on manufacturing companies. Since the shaft and the movable disk require a change in diameter so as to be compatible with a pressing member, they are poor in versatility.

In addition, as with the device disclosed in Patent Literature 1, there are also found a clearance between a hydraulic expansion/contraction shaft for a slitter and a holder for fixing a blade to be attached on the shaft, and a clearance between a shaft based on the air shaft method for a separator and a holder for a movable disk, as described above. Thus, there is demanded a disposing device capable of realizing stable movement of a blade and a movable disk.

The present invention has been made in view of the above-described situation, an object of which is to provide a disposing device of shaft-body insertion objects which is capable of disposing at a desired position of a shaft body efficiently and stably shaft-body insertion objects such as a movable disk of a separator and a blade of a slitter used in a slitter line and also excellent in attachability in the slitter line.

Means for Solving the Problems

In order to attain the above-described object, a disposing device of shaft-body insertion objects in the present invention is provided with an expansion/contraction shaft which is disposed at a predetermined position in a slitter line of a metal strip and formed in a tubular shape, having an outer circumference surface which is constituted so as to expand and contract freely on a cross section when viewed in a longitudinal direction, a holder having an inner circumference which can be fitted outside an outer circumference surface of the expansion/contraction shaft, a ring member which is formed with an approximately doughnut-shaped thin plate and integrated with the holder, a disposing device main body which is capable of moving approximately in parallel along the expansion/contraction shaft, a chuck pedestal which is attached on the side of the expansion/contraction shaft of the disposing device main body and connected to a cylinder, a piston which is formed in a rod shape, with one end thereof being connected to the cylinder and the other end thereof being constituted so as to expand and contract freely to the side of the expansion/contraction shaft, a chuck base which can be fitted to the chuck pedestal and also is fixed to the other end of the piston, and a chuck tip which is installed on a side opposite to the piston of the chuck base and also in contact with an outer circumference surface of the holder in association with expansion of the piston, having a cross section which is formed in a recessed manner when viewed from a shaft center direction of the expansion/contraction shaft.

Here, the expansion/contraction shaft is disposed at a predetermined position in the slitter line of a metal strip, by which the expansion/contraction shaft can be used as a supporting body for attaching the holder and the ring member which is formed integrally with the holder. The predetermined position is, for example, above or below upper/lower cutter portions of the slitter, after a loop, before and after a winding-tension imparting device, and before a recoiler in the slitter line.

Further, the expansion/contraction shaft is formed in a tubular shape and the outer circumference surface thereof is constituted so as to expand and contract freely on a cross section when viewed in the longitudinal direction, thus making it possible to fix the holder and the ring member at a predetermined position. That is, after the holder and the ring member have been disposed at intended positions, the outer circumference surface of the shaft is allowed to expand, by which they can be fixed at the positions. Further, since the shaft is formed in a tubular shape, it can be formed into an expansion/contraction shaft based on the air-shaft method having, for example, an air induction path formed therein for filling and releasing air, thereby allowing the outer circumference surface of the shaft to expand and contract, or a hydraulic expansion/contraction shaft in which the shaft is double-structured and hydraulic pressure is applied to the inside, thereby allowing the shaft to expand and contract.

Still further, the holder has an inner circumference which can be fitted outside an outer circumference surface of the expansion/contraction shaft, thus making it possible to dispose the holder on the expansion/contraction shaft. Still further, the holder and the ring member can be changed in positions along the expansion/contraction shaft. The holder can be used, for example, as a member which fixes the separator disk to the shaft center of the shaft at a right angle or as a member which prevents the bottom of a strip from being directly in contact with the shaft. The inner circumference of the holder is formed so as to be larger than the outer circumference of the expansion/contraction shaft, thus resulting in a clearance between them.

In addition, the ring member is formed with an approximately doughnut-shaped thin plate and integrated with the holder, by which the ring member and the holder are integrated together to give a single member. Accordingly, when one of the ring member and the holder is pushed, both of them are allowed to move along the shaft. The ring member mentioned here denotes a member which is fixed to the holder, for example, a separator disk on a separator or a round blade on a cutter stand.

The disposing device is also structured so that the disposing device main body capable of moving substantially in parallel along the expansion/contraction shaft and the chuck pedestal which is attached on the side of the expansion/contraction shaft of the disposing device main body and connected to the cylinder are used, thereby allowing the chuck pedestal to move along the expansion/contraction shaft.

Further, the disposing device is also structured so that the piston is formed in a rod shape, and one end thereof is connected to the cylinder and the other end thereof is constituted so as to expand and contract to the side of the expansion/contraction shaft, by which the piston is allowed to move between the chuck pedestal and the expansion/contraction shaft.

Further, the chuck base which can be fitted to the chuck pedestal and also is fixed to the other end of the piston is provided, by which the chuck base is allowed to move via the piston between the chuck pedestal and the expansion/contraction shaft, with the chuck pedestal given as a member of the base.

The chuck tip is installed on a side opposite to the piston of the chuck base and brought into contact with an outer circumference surface of the holder in association with expansion of the piston, having a cross section which is formed in a recessed manner when viewed in a shaft center direction of the expansion/contraction shaft, by which it is possible to impart a pressure by being in contact with the outer circumference surface of the holder. As a result, it is possible to fill a clearance between the inner circumference surface of the holder and the outer circumference surface of the expansion/contraction shaft. That is, the holder and the ring member are allowed to move smoothly along the expansion/contraction shaft. Further, the chuck tip is connected via the chuck base and the chuck pedestal to the disposing device main body. Therefore, in a state that the clearance between the inner circumference surface of the holder and the outer circumference surface of the expansion/contraction shaft is filled, the holder and the ring member are allowed to move smoothly along the shaft center direction of the expansion/contraction shaft. On movement of the holder and the ring member, the chuck base and the chuck tip are in contact with a side surface of the ring member (or a side surface of the holder), thereby allowing the holder and the ring member to move. Further, the cross section of the chuck tip is formed in a recessed manner, by which the chuck tip is able to more easily come into contact with the outer circumference surface of the holder. The disposing device is also structured so that on movement of the holder and the ring member, the chuck base and the chuck tip push a side surface of the ring member more easily, while being in contact with the outer circumference surface of the holder, with a pressure imparted thereto. Here, the pressure imparted by the chuck tip by being in contact with the outer circumference surface of the holder denotes a pressure applied from the outer circumference side of the holder to the inner circumference side thereof.

Further, where such a constitution is provided that a contact pressure imparted to the outer circumference surface of the holder can be controlled when the chuck tip comes into contact with the outer circumference surface of the holder, an appropriate pressure can be imparted. Thereby, the holder and the ring member are allowed to move more smoothly along the expansion/contraction shaft.

Further, where a groove portion is formed on the chuck pedestal so as to be straight from the chuck pedestal to the expansion/contraction shaft and an inner circumference surface thereof is at least partially in contact with both members of the chuck base and the chuck tip and where the chuck base and the chuck tip move in association with expansion and contraction of the piston, while sliding along the groove portion on the chuck pedestal, the chuck base and the chuck tip are allowed to move forward and backward stably in association with movement of the piston.

Further, where the chuck base and the chuck tip move within a range of the groove portion on the chuck pedestal, the chuck base and the chuck tip are allowed to move forward and backward stably between the chuck pedestal and the expansion/contraction shaft, and they are also allowed to move stably along the expansion/contraction shaft. That is, for example, the chuck base and the chuck tip are always kept in contact with the groove portion on the chuck pedestal, thus making it possible to reduce deviation of the chuck base and the chuck tip on movement. As a result, it is possible to dispose a ring member more strictly.

Further, where the chuck tip is provided at a position in contact with the outer circumference surface of the holder with a roller portion which is attached so as to rotate freely along a direction at which the disposing device main body moves, the chuck tip is allowed to move smoothly in parallel along the expansion/contraction shaft. That is, during a period of time in which the chuck tip comes into contact with the outer circumference surface of the holder and then the chuck base and the chuck tip come into contact with a side surface of the ring member, the roller portion in contact with the outer circumference surface of the holder rotates in association with movement of the chuck tip, by which the chuck tip can move smoothly.

Further, where a region of the chuck tip in contact with the outer circumference surface of the holder is formed with a material low in frictional properties, the chuck tip is allowed to move smoothly in parallel along the expansion/contraction shaft. That is, during a period of time in which the chuck tip comes into contact with the outer circumference surface of the holder and then the chuck base and the chuck tip come into contact with a side surface of the ring member, friction is decreased between the chuck tip and the outer circumference surface of the holder, thereby allowing the chuck tip to move smoothly.

Further, where the chuck tip is formed so as to give a tapered portion which is decreased in thickness in a direction opposite to the chuck base on a cross section when viewed in a direction orthogonal to a shaft center direction of the expansion/contraction shaft, that is, for example, on a cross section when viewed in a direction orthogonal to the shaft center direction of the expansion/contraction shaft, the chuck tip is easily in surface contact with a ring member which is decreased in thickness in a distal direction. Thus, the holder and the ring member are allowed to move stably along the expansion/contraction shaft. Here, a description has been given of a structure in which a tapered portion is formed only at the chuck tip. In the case of a structure in which the chuck tip is formed integrally with the chuck base, such a structure is also acceptable in which the tapered portion extends also to the chuck base.

Still further, in order to attain the above-described object, a disposing device of shaft-body insertion objects of the present invention is provided with a disposing device main body capable of moving substantially in parallel along an expansion/contraction shaft which is disposed at a predetermined position in a slitter line of metal strips and able to fix a holder formed integrally with a ring member, a chuck pedestal which is attached to the side of the expansion/contraction shaft of the disposing device main body and connected to a cylinder, a piston which is formed in a rod shape, with one end thereof being connected to the cylinder and the other end thereof being constituted so as to expand and contract to the side of the expansion/contraction shaft, a chuck base which can be fitted to the chuck pedestal and also fixed to the other end of the piston, and a chuck tip which is installed on a side opposite to the piston of the chuck base and also in contact with an outer circumference surface of the holder in association with expansion and contraction of the piston, having a cross section formed in a recessed manner when viewed from a shaft center direction of the expansion/contraction shaft.

Here, the disposing device is structured so that the disposing device main body capable of moving substantially in parallel along the expansion/contraction shaft and the chuck pedestal which is attached to the side of the expansion/contraction shaft of the disposing device main body and connected to the cylinder are used, thereby allowing the chuck pedestal to move along the expansion/contraction shaft.

The disposing device is also structured so that there is provided the piston which is formed in a rod shape, with one end thereof being connected to the cylinder and the other end thereof being constituted so as to expand and contract to the side of the expansion/contraction shaft, thereby allowing the piston to move between the chuck pedestal and the expansion/contraction shaft.

Further, there is provided the chuck base which can be fitted to the chuck pedestal and is fixed to the other end of the piston, thereby allowing the chuck base to move via the piston between the chuck pedestal and the expansion/contraction shaft, with the chuck pedestal given as a member of the base.

Further, the chuck tip which is installed on a side opposite to the piston of the chuck base and brought into contact with the outer circumference surface of the holder in association with expansion and contraction of the piston, having a cross section which is formed in a recessed manner when viewed from the shaft center direction of the expansion/contraction shaft, is able to impart a pressure by being in contact with the outer circumference surface of the holder. As a result, it is possible to fill a clearance between the inner circumference surface of the holder and the outer circumference surface of the expansion/contraction shaft. That is, the holder and the ring member are allowed to move smoothly along the expansion/contraction shaft. Further, the chuck tip is connected via the chuck base and the chuck pedestal to the disposing device main body. Therefore, in a state in which the clearance is filled between the inner circumference surface of the holder and the outer circumference surface of the expansion/contraction shaft, the holder and the ring member are allowed to move along the shaft center direction of the expansion/contraction shaft. On movement of the holder and the ring member, the chuck base and the chuck tip are in contact with a side surface of the ring member (or a side surface of the holder), thereby allowing the holder and the ring member to move. Further, the chuck tip is formed so as to give a cross section in a recessed manner, by which the chuck tip can easily come into contact with the outer circumference surface of the holder. The disposing device is also structured so that on movement of the holder and the ring member, the chuck tip pushes a side surface of the ring member, thereby allowing the holder and the ring member to move easily, while being in contact with the outer circumference surface of the holder to impart a pressure.

Effects of the Invention

The disposing device of shaft-body insertion objects according to the present invention is capable of disposing at a desired position of a shaft body efficiently and also stably shaft-body insertion objects such as a movable disk of a separator and a blade of a slitter which are used in a slitter line and also excellent in attachability in the slitter line.

BRIEF DESCRIPTION OF THE DRAWINGS

FIG. 1 is a drawing which shows a brief structure of a slitter line.

FIG. 2 is a schematic drawing which shows a structure of a disposing device of shaft-body insertion objects to which the present invention is applied.

FIG. 3 is a schematic drawing which shows the vicinity of a chuck when viewed from a direction orthogonal to a shaft center direction of an expansion/contraction shaft.

FIG. 4 is a schematic drawing which shows the vicinity of the chuck when viewed from the shaft center direction of the expansion/contraction shaft.

FIG. 5 is a drawing which shows a state in which an arm expands, by which the chuck is in contact with an outer circumference surface of a holder.

FIG. 6 is a schematic perspective view which shows a structure in the vicinity of the chuck.

FIG. 7 (a) is a schematic drawing of the expansion/contraction shaft, (b) is a schematic cross sectional view which shows an expanded state of a long lug, and (c) is a schematic cross sectional view which shows a contracted state of the long lug.

FIG. 8 (a) is a side elevational view which shows one example of the chuck and (b) is a side elevational view which shows another example of the chuck.

FIG. 9 is a schematic drawing which shows the other example of the chuck.

FIG. 10 is a schematic drawing which shows a structure of a conventional disposing device of a spacer and a blade.

FIG. 11 is a schematic cross sectional view which shows a clearance between the shaft and the blade.

FIG. 12 (a) is a schematic cross sectional view which shows a structure of a pressing member of the conventional disposing device of a spacer and a blade, and (b) is a schematic side elevational view thereof.

BEST MODE FOR CARRYING OUT THE INVENTION

Hereinafter, a detailed description will be given of the embodiment of the present invention.

FIG. 1 briefly shows a structure of a slitter line of metal strips. A slitter line 1 is provided with an uncoiler 2 which sends out a sheet-like metal plate, a cutter stand having a slitter 3 which cuts the metal plate into a plurality of strips 12, a winding-tension imparting device 4 which imparts tension to a winding coil, and a recoiler 5 which winds the plurality of strips in a roll shape.

The slitter line 1 is also provided with a loop 8 which absorbs sagging occurring due to a difference in thickness between strips. Further, a separator 11 is disposed after the loop 8, before and after the winding-tension imparting device 4, and before the recoiler 5 in the slitter line 1.

A disposing device 13 which is an example of the disposing device of shaft-body insertion objects according to the present invention is provided with a separator 14 and a separator disposing portion 15, as shown in FIG. 2.

The separator 14 is constituted with an expansion/contraction shaft 16 and a movable disk in which a holder 17 is formed integrally with a separator disk 18. The expansion/contraction shaft 16 is attached to a supporting base 21 so as to rotate freely via a rotary joint 19 and a supporting portion 20. The expansion/contraction shaft 16 rotates in association with a strip to be threaded. In order to clearly show the drawing, only one movable disk is illustrated in FIG. 2. However, the device is actually provided with a plurality of movable disks attached on the expansion/contraction shaft in accordance with the number of strips.

Further, the expansion/contraction shaft 16 is internally provided with a conduction path for compressed air and constituted so as to fill and release freely the compressed air through a compressed air inlet (not shown in the drawing). The compressed air is thus filled and released, by which a long lug is subjected to expansion and contraction, thereby providing a structure capable of adjusting dimensionally an outer circumference of the expansion/contraction shaft 16. A detailed structure of the expansion/contraction shaft 16 will be described below.

The movable disk is constituted with the holder 17 and the separator disk 18. The holder 17 is a member which is formed in a tubular shape and can be attached on the expansion/contraction shaft 16 on the side of an inner circumference surface thereof. An outer circumference surface of the holder 17 is formed with a material such as polyurethane and a main body portion thereof is formed with metal.

An inner circumference of the holder 17 is formed larger than an outer circumference of the expansion/contraction shaft 16, thereby developing a certain clearance between them on attachment. The clearance varies in dimension depending on types of the holder 17 and the expansion/contraction shaft 16, and the dimension is not particularly restricted. Inmost cases, the inner circumference of the holder 17 (movable disk) is made larger by 10% to 20% than the outer circumference of the expansion/contraction shaft 16.

The separator disk 18 is formed with a thin metal in an approximately doughnut shape. Further, one separator disk 18 is held between two members which constitute the holder 17 and sites at which they are in contact are fixed with screws, thereby providing a structure in which the holder 17 is formed integrally with the separator disk 18. The separator disk 18 is fixed substantially at the center of the holder 17 when viewed laterally. Still further, when viewed laterally, the holder 17 is a member slightly thick in thickness, while the separator disk 18 is a member thinner in thickness.

A stopper 49 is also installed in the vicinity of an end of the expansion/contraction shaft 16. The stopper 49 is a member which pushes against a plurality of movable disks before being disposed, thereby regulating the movement thereof when moving to the left side of the expansion/contraction shaft 16. There is found a state in which the plurality of movable disks are pushed to a position of the stopper 49 and they are put in arrangement. This state is an initial state before they are disposed.

Upon expansion of the outer circumference of the expansion/contraction shaft 16, the movable disk (holder 17) is fixed at a position thereof on the expansion/contraction shaft 16. Further, upon contraction of the outer circumference of the expansion/contraction shaft 16, a fixed state is released, and a side surface of the holder 17 or that of the separator disk 18 is pushed, by which the movable disk is allowed to move in the shaft center direction along the expansion/contraction shaft 16.

Here, such a structure is not necessarily adopted in which the expansion/contraction shaft is capable of adjusting dimensionally the outer circumference thereof by expansion and contraction of a long lug. It is, however, preferable to adopt an expansion/contraction shaft based on the air shaft method due to the fact that the holder 17 can be fixed easily and a fixed state thereof can be released easily.

As shown in FIG. 2, the separator disposing portion 15 is a member which allows a movable disk released from a fixed state by the expansion/contraction shaft 16 to move. The separator disposing portion 15 is provided with a ball screw 22 and an arm 23. The arm 23 is a member which comes into contact with the holder 17 and the separator disk 18 and allows them to move.

The ball screw 22 is disposed substantially in parallel with the expansion/contraction shaft 16 and attached via a shaft bearing 24 to a supporting base 21 so as to rotate freely. Further, the ball screw 22 is formed longer in entire length than the expansion/contraction shaft 16. The ball screw 22 is a member to which a rotary force is imparted from a servomotor 25, rotating autonomously, thereby allowing the arm 23 to move along the ball screw 22 (in the lateral direction in FIG. 2).

A distance that the arm 23 moves can be controlled by a unit of 0.1 mm by the servomotor 25. Further, the arm 23 is allowed to move via the servomotor 25 by setting a movement pattern with the use of an existing controller. Movement of the arm 23 is such that the arm 23 moves, for example, by 25 mm in a horizontal direction by rotating the ball screw 22 once. Rotation of the ball screw 22 is controlled, thereby controlling movement of the arm 23 along the ball screw 22.

The arm 23 is provided with a driving portion 26 which is fitted to the ball screw 22 to receive the rotation thereof, thereby moving along the ball screw 22, a chuck pedestal 27 which is attached to the driving portion 26 and an air cylinder 28 which is fixed to the chuck pedestal 27. Further, a piston 29 is attached to the air cylinder 28, and the piston 29 moves while expanding and contracting between the air cylinder 28 and the expansion/contraction shaft 16.

The arm 23 is also provided with a chuck portion 30 which is connected to the piston 29 and can be fitted to the chuck pedestal 27. The chuck portion 30 is a member in which the chuck tip is formed integrally with the chuck base in the claims of the present application and is a portion in contact with the holder 17 and the separator disk 18.

The chuck pedestal 27 is a supporting member of the chuck portion 30 formed with a metal and moves together with the driving portion 26 and the air cylinder 28 in an integrated manner in association with movement of the driving portion 26 along the ball screw 22.

The chuck portion 30 is a member which is disposed at a position closest to the expansion/contraction shaft 16 among members of the arm 23. The chuck portion 30 comes close to or moves away from the expansion/contraction shaft 16 in association with expanding and contracting motions of the piston 29 (in the vertical direction in FIG. 2). Further, the chuck portion 30 comes into contact with an outer circumference surface of the holder 17, a side surface of the holder 17 and a side surface of the separator disk 18 in association with movement of the piston 29 and the driving portion 26.

The chuck portion 30 is detected for a perpendicular height position by a position sensor (not shown in the drawing) and controlled for forward/backward movement via the air cylinder 28. Further, the arm 23 is allowed to move by setting a certain pattern, together with controlled movement of the driving portion 26 along the ball screw 22 via the above-described servomotor 25. Here, the certain pattern is a pattern of a series of motions where the movable disk is disposed in accordance with the width of a strip.

Further, the perpendicular height position of the chuck portion 30 is set at three points, that is, a standby position at which the piston 29 is kept contracted, a contact position to be described below at which the chuck portion 30 is in contact with an outer circumference surface of the holder 17, and a maximum expansion position at which all the movable disks are gathered at an end of the expansion/contraction shaft 16.

Here, the arm 23 need not necessarily be allowed to move in a horizontal direction by the ball screw 22 and the servomotor 25. It will be sufficient that the arm 23 is constituted so as to move along the shaft center direction of the expansion/contraction shaft 16.

Further, the chuck portion 30 need not necessarily be structured so as to move up and down by the air cylinder 28 and the piston 29. It will be sufficient that the chuck portion 30 may be brought close to or spaced away from the expansion/contraction shaft 16 and may come into contact with the outer circumference surface of the holder 17.

Further, the chuck portion 30 need not necessarily be formed so as to give a structure in which the chuck tip is integrated with the chuck base as claimed in the present application. For example, there may be provided such a structure in which the chuck tip and the chuck base are formed with different members and connected together. Or, the members may be both formed with the same material or each of them may be formed with a different material.

Further, in the disposing device 13 shown in FIG. 2 which is an example of the disposing device of shaft-body insertion objects to which the present invention is applied, the separator disposing portion 15 is installed below the separator 14. A constitution of the present invention shall not be, however, restricted thereto. There may be provided such a constitution in which the separator disposing portion 15 is installed, for example, above the separator 14. In this instance as well, the separator 14 and the separator disposing portion 15 are different only in a positional relationship and not different in that the movable disk is allowed to move smoothly along the expansion/contraction shaft 16. The separator disposing portion may also be installed obliquely below the separator. However, the separator disposing portion 15 is installed below the separator 14, thereby providing a structure in which an operator is able to easily observe the flow of strips to be threaded in a slitter line, finding it easy to confirm the line. It is, therefore, preferable that the separator disposing portion 15 is installed below the separator 14.

Still further, the disposing device 13 shown in FIG. 2 which is one example of the disposing device of shaft-body insertion objects to which the present invention is applied is described as a disposing device of a separator. An application of the present invention shall not be restricted thereto. This device is also applicable to a case where a cutter portion (slitter) of a cutter stand is disposed.

More specifically, the member described above as the separator 14 is replaced by a cutter portion installed on a cutter stand, thereby providing a disposing device 13. The cutter portion is a member which holds a sheet-like metal plate by a pair of upper and lower sides and slits the metal plate into a strip with a predetermined width. The cutter portion is constituted with a hydraulic expansion/contraction shaft with a certain length (corresponding to the above-described "expansion/contraction shaft 16") and a round blade which is fixed to a holder attached thereto (corresponding to the above-described "holder 17" and "separator disk 18").

That is, at the cutter portion of the cutter stand as well, the ring-shaped holder and the round blade which are inserted outside the hydraulic expansion/contraction shaft are appropriately positioned in accordance with the width of a strip. Further, the inner circumference of the holder and that of the round blade are made larger than the outer circumference of the hydraulic expansion/contraction shaft, by which the disposing device 13 allows the holder and the round blade to move along the shaft.

Further, a position at which the disposing device 13 is positioned in relation to the cutter portion is not in particular restricted, as long as the position will not interfere with existing members of the cutter stand. The disposing device 13 may be installed, for example, above an upper cutter portion or below a lower cutter portion. As described above, the disposing device 13 which is one example of the disposing device of shaft-body insertion objects according to the present invention is also applicable to a case where a holder and a round blade are disposed along a hydraulic expansion/contraction shaft at a cutter portion of a cutter stand. A structure of the chuck portion in the disposing device 13 and motions of the arm 23 to the movable disk which will be described in this paragraph and subsequent paragraphs are similar to those of the disposing device used in the cutter portion.

A description will be given of a more detailed structure of the chuck portion 30 and members in the vicinity thereof, with reference to FIG. 3. As shown in FIG. 3, when viewed from a direction orthogonal to the shaft center direction of the expansion/contraction shaft, the members are disposed from below to the expansion/contraction shaft (not shown in the drawing) in the order of the ball screw 22, the driving portion 26, the air cylinder 28 and the chuck pedestal 27. Further, the chuck portion 30 is connected to the air cylinder 28 via the piston 29.

A fitting groove 31 is formed on the chuck pedestal 27 in the perpendicular direction, thereby providing a structure in which both side surfaces 32 of the chuck portion 30 are in contact with the fitting groove 31 and can be fitted thereinto. In the chuck portion 30, the both side surfaces 32 slide along the fitting groove 31 in association with expanding and contracting motions of the piston 29, thereby conducting forward/backward movement in the vertical direction as shown in FIG. 3.

Further, the chuck portion 30 is controlled for the perpendicular height position, as described above. The side surfaces of the chuck portion 30 are kept in contact with an inner circumference surface of the fitting groove 31 even at a position expanding to the greatest extent (maximum expansion position). That is, a movement range of the chuck portion 30 in the perpendicular direction is regulated within a range in contact with the fitting groove 31. As a result, the chuck portion 30 is structured so as to be supported by the chuck pedestal 27 upon expansion of the chuck portion 30, by which the piston 29 is less likely to undergo deflection, and movement of the chuck portion 30 can be controlled with a high degree of accuracy.

Still further, where a movable disk is allowed to move to a predetermined disposed position, the chuck portion 30 rises up to a position of the reference symbol 30' indicated by the dotted line in FIG. 3, an upper end surface of the chuck portion 30 comes partially into contact with a position of the holder 17 indicated by the reference symbol 33, thereby imparting a contact pressure. This contact pressure fills a clearance between the expansion/contraction shaft and the holder 17. In the case shown in FIG. 3, the holder 17 is held upward from below and the inner circumference surface thereof is kept pushed to the outer circumference surface of the expansion/contraction shaft.

A pressure imparted by the chuck portion 30 in contact with the outer circumference surface of the holder 17 can be adjusted in a range of 0 to 0.4 MPa by adjusting an air pressure of the air cylinder 28.

Further, three sensors are attached on the air cylinder 28 and these sensors are to detect positions of the air cylinder 28 for conducting subsequent motions. The three sensors consist of a first sensor which detects a contraction position of the arm 23, a second sensor which detects a contact position of the holder 17 and a third sensor which detects a maximum expansion position of the arm 23 (corresponding to a position at which a side surface of the holder 17 is pushed). The second sensor is able to detect a wider range of positions and constituted so as to be in contact with the holder 17 even where the holder is varied in height.

FIG. 4 and FIG. 5 are drawings, each of which shows a contact position between the chuck portion 30 and the outer circumference surface of the holder 17. As shown in FIG. 4, where the chuck portion 30 is viewed from the shaft center direction of the expansion/contraction shaft 16, an end surface of the chuck portion 30 on the upper side is formed in an approximately V-letter shape 34, and a roller 35 is installed each at the midpoint thereof.

The roller 35 is attached at the chuck portion 30 so as to rotate freely. The roller 35 comes into contact with a position 36 on the outer circumference surface of the holder 17 and is given as a portion which imparts a contact pressure to the holder 17. As shown in FIG. 5, when the piston 29 expands to raise the chuck portion 30, the roller 35 comes into contact with the position 36 on the outer circumference surface of the holder 17. FIG. 6 is a schematic perspective view which shows a positional relationship between the chuck portion 30, the holder 17 and the separator disk 18.

Further, after the roller 35 has been in contact with the outer circumference surface of the holder 17, the driving portion 26 moves in the horizontal direction along the ball screw 22. With a contact pressure imparted to the outer circumference surface of the holder 17, the chuck portion 30 comes close to a side surface of the separator disk 18, and a side surface of the chuck portion 30 comes into contact therewith.

That is, the chuck portion 30 moves along the shaft center direction of the expansion/contraction shaft 16 from a position at which the roller 35 is in contact with the outer circumference surface of the holder 17 to a position at which the chuck portion 30 comes into contact with the side surface of the separator disk 18. A portion which is covered by the two-direction arrow and indicated by the reference symbol T in FIG. 3 is a distance of movement in the horizontal direction up to which the chuck portion 30 comes into contact with the side surface of the separator disk 18.

When the chuck portion 30 moves in the horizontal direction, the roller 35 is kept in contact with the outer circumference surface of the holder 17. Therefore, in association with the movement, the roller rotates in a direction reverse to a direction in which the chuck portion 30 moves, by which the chuck portion 30 is allowed to move smoothly in the horizontal direction.

The chuck portion 30 comes into contact with the side surface 37 of the separator disk 18 (refer to FIG. 3) and, thereafter, further moves forward along the shaft center direction of the expansion/contraction shaft 16, continuing to move while pushing the side surface of the separator disk 18. This movement allows a movable disk to move along the expansion/contraction shaft 16. The driving portion 26 (rotation of the ball screw 22) stops at a predetermined position and the piston 29 conducts expansion and contraction, thereby completely disposing one movable disk.

A position of the side surface 37 on the separator disk 18 which is pressed by the side surface of the chuck portion 30 in contact therewith may not be a specific site on the separator disk such as a position which is pressed by the disposing device described as the prior art of the present invention. In addition, no particular restriction is given, as long as it is a position with which the side surface of the chuck portion 30 can be in contact. As described above, the chuck portion 30 comes into contact with the outer circumference surface of the holder 17, thereby pushing the side surface 37 of the separator disk 18, while imparting a pressure. It is, therefore, less likely that getting caught or backlash resulting from a clearance between the outer circumference surface of the expansion/contraction shaft 16 and the inner circumference surface of the holder 17 occurs.

Further, there is no restriction on a position which is pressed on the separator disk 18. And, a side surface of the disk on an end side can be pressed, thus making it possible to shorten an expansion/contraction stroke of the chuck portion 30. Although a conventional disposing device is, for example, about 30 to 40 cm in expansion/contraction stroke, this disposing device is less than a half thereof in expansion/contraction stroke.

Here, the fitting groove 31 is not necessarily formed on the chuck pedestal 27 in the perpendicular direction. However, the chuck portion slides along the fitting groove to conduct the forward/backward movement, by which the chuck portion is allowed to move stably. It is, therefore, preferable that the fitting groove 31 is formed on the chuck pedestal 27 in the perpendicular direction.

Further, the side surface of the chuck portion 30 is not necessarily formed so as to be kept in contact with the inner circumference surface of the fitting groove 31 at a maximum expansion position of the chuck portion 30. However, the piston is less likely to undergo deflection upon expansion of the chuck portion and a movable disk is pressed and allowed to move by the chuck portion with a higher degree of accuracy. It is, therefore, preferable that the side surface of the chuck portion 30 is formed so as to be kept in contact with the inner circumference surface of the fitting groove 31 at a maximum expansion position of the chuck portion 30.

Further, a pressure which is imparted by the chuck portion 30 in contact with the outer circumference surface of the holder 17 need not necessarily be adjustable in a range of 0 to 0.4 MPa. It is not necessary either that the pressure is limited to a range of 0 to 0.4 MPa. However, if the pressure is adjusted within the above-described range, it makes it possible to impart the pressure sufficiently to the holder. It is, therefore, preferable that the pressure imparted by the chuck portion 30 in contact with the outer circumference surface of the holder 17 can be adjusted in a range of 0 to 0.4 MPa.

Still further, the end surface of the chuck portion 30 on the upper side is not necessarily formed in an approximately V-letter shape 34. The end surface may be formed, for example, in a recessed circular arc-shape. In addition, the shape of the end surface and an extent of the recessed portion thereof can be appropriately set according to the sizes of a holder and a separator disk to be used.

Further, the roller 35 is not necessarily attached at the chuck portion 30, and such a structure will be sufficient in which friction is decreased on contact with the outer circumference surface of the holder 17. However, due to the fact that the chuck portion is allowed to move more smoothly in the horizontal direction, it is preferable that the roller 35 is attached at the chuck portion 30.

Next, a description will be given of a detailed structure of the expansion/contraction shaft by referring to FIG. 7. In the disposing device 13 which is one example of the disposing device of shaft-body insertion objects according to the present invention, there can be used as the expansion/contraction shaft a shaft based on the air shaft method capable of adjusting an outer circumference thereof by filling and releasing compressed air.

As the shaft based on the air shaft method, it is possible to adopt, for example, the expansion/contraction shaft disclosed in Patent Literature 2 (Japanese Published Unexamined Patent Application No. H10-156654). The expansion/contraction shaft 16 of the disposing device 13 is also similar in structure.

As shown in FIG. 7(a), the expansion/contraction shaft 16 is connected to a rotary joint 19 and also connected to a compressed air inlet 38 which is coupled with a compressed air supply source (not shown in the drawing). Further, a long groove 39 is formed on an outer circumference surface of the expansion/contraction shaft 16, and a long lug 40 is disposed at a part of the groove 39. The long lug 40 is a part which undergoes expansion/contraction by filling and releasing compressed air and the part expands, thereby fixing a movable disk.

The length of the long groove 39 and that of the long lug 40 are formed substantially equal to the length of the expansion/contraction shaft 16 in the longitudinal direction. Further, the long groove 39 and the long lug 40 are installed on the outer circumference surface of the expansion/contraction shaft 16 at certain intervals. That is, such a structure is provided in which the long lug 40 is disposed on the circumference at certain intervals when the expansion/contraction shaft 16 is viewed in the transverse direction.

Inside the long lug 40, that is, inside the expansion/contraction shaft 16, as shown in FIG. 7 (b), a fluid conduction path 41 is formed which is communicatively connected to the compressed air inlet 38. The fluid conduction path 41 is also communicatively connected to a fluid inlet 42 and the groove 39, thus making it possible to introduce compressed air.

A bottom of the long lug 40 is formed with an elastic member which can seal the groove 39. Compressed air is filled and released, by which an inclined surface of the bottom slides along an inside surface of the groove 39, and protruding on the outer circumference surface of the expansion/contraction shaft 16. The inclined surface of the bottom of the long lug 40 undergoes elastic deformation and is pressed closely to the inside surface of the groove 39, thereby keeping compressed air hermetically. In this instance, as shown in FIG. 7 (b), the protruded long lug 40 presses the inner circumference surface of the holder 17 in an outward direction, thereby fixing a movable disk.

Further, as shown in FIG. 7 (c), such a structure is provided in which when compressed air is released, the inclined surface of the bottom of the long lug 40 returns to an original shape due to its elasticity, and the long lug 40 sinks below the outer circumference surface of the expansion/contraction shaft 16, thereby releasing a fixed state of the movable disk.

Next, a description will be given of another embodiment of the chuck portion of the present invention.

A description will be given of a structure in which a tapered portion is installed on a side surface of the chuck portion by referring to FIG. 8. In the above-described chuck portion 30, as shown in FIG. 8 (a), a region in contact with the side surface 37 of the separator disk 18 is formed in a rectangular shape in thickness when viewed laterally.

Here, an existing separator disk 18 is formed so that an end side 43 is thinner in thickness than a central side 44, giving a pointed shape when viewed laterally, as shown in FIG. 8 (a) and FIG. 8 (b).

Therefore, as another embodiment of the chuck portion, there may be available such a chuck portion 45 that has a shape shown in FIG. 8 (b). The chuck portion 45 is provided with a tapered portion 46 so that an end side thereof is thinner in thickness when viewed laterally. The tapered portion 46 is installed, by which the chuck portion 45 is formed in such a shape that comes more easily into contact with the side surface of the separator disk 18.

As a result, the holder 17 and the separator disk 18 are allowed to move more smoothly when the chuck portion 45 presses them. In the chuck portion 45, parts other than a part at which the tapered portion 46 is installed are similar in structure to those of the above-described chuck portion 30.

A description will be given of a structure in which the end surface of the chuck portion is formed with a material low in frictional properties by referring to FIG. 9. As shown in FIG. 9, a chuck portion 47 which is one example of other embodiments of the chuck portion is not provided with the above-described roller 35, and a part 48 of the end surface on the upper side is formed with a material low in frictional properties, for example, fluororesin. Fluororesin is a material with a low friction coefficient, that is, a coefficient of dynamic friction that is from about 0.04 to 0.08, although it depends on types of the resin.

Therefore, the part 48 of the end surface of chuck portion 47 on the upper side is formed with fluororesin, thus making it possible to reduce friction with the outer circumference surface of the holder 17. That is, it is possible to reduce friction which occurs on further movement of the chuck portion 47 to the separator disk 18 in a state that the chuck portion 47 is in contact with the outer circumference surface of the holder 17. Here, there is shown an example of a structure in which the part 48 of the end surface of the chuck portion 47 on the upper side is formed with fluororesin. In addition to this example, such a structure can be adopted in which the upper end surface of the chuck portion is coated with fluororesin.

Hereinafter, a description will be given of a series of movements of a movable disk when the disposing device 13 which is one example of the above-described disposing device of shaft-body insertion objects is used.

(Preparation Step Prior to Change in Disposition)

First, a stage at which the separator 14 has been used in threading a strip with a predetermined width is referred to as a first stage of the step. In this instance, in the separator 14, a movable disk is disposed at an interval according to the width of the strip and fixed at a corresponding position.

A controller which releases a fixed state by the expansion/contraction shaft 16 to control the separator disposing portion 15 is used to start a driving program set in accordance with the width of a strip. As shown in FIG. 2, in a state that the arm 23 contracts, the driving portion 26 stands ready at a right-side end of the ball screw 22 (the side in a direction indicated by the arrow of reference symbol A).

Then, the piston 29 expands, by which the chuck portion 30 expands up to a maximum expansion position. When the chuck portion 30 expands up to the maximum expansion position, a side surface of the chuck portion 30 on the side of the tip can be brought into contact with a side surface of the holder 17. In a state in which the chuck portion 30 expands up to the maximum expansion position, the above-described third sensor detects the position, by which motions are allowed to proceed. In addition, the chuck portion 30 is positioned further on the right-hand side from a movable disk which is installed on the rightmost side of the expansion/contraction shaft.

Then, the side surface of the chuck portion 30 moves to a left-side end of the expansion/contraction shaft 16 (a direction indicated by the arrow of reference symbol B), while being in contact with the side surface of the holder 17. In this instance, a plurality of movable disks disposed on the expansion/contraction shaft are sequentially brought into contact with adjacent members from the right-hand side and pushed, thereby moving altogether up to the stopper 49 at the left-side end of the expansion/contraction shaft 16. A front-running movable disk stops the movement at a position of the stopper 49, resulting in a state in which the plurality of movable disks are fixed and put in arrangement, thereby completing the preparation step prior to change in disposition.

(Step of Disposing Movable Disks)

Then, after complete movement of the plurality of movable disks, the arm 23 contracts, by which the driving portion 26 moves to the left-side end of the ball screw 22. When the driving portion 26 comes in the vicinity of the left-side end of the ball screw 22, the piston 29 then expands and the chuck portion expands up to a position in contact with the outer circumference surface of the holder 17. After this fact has been detected by the above-described second sensor, the driving portion 26 moves in a direction indicated by the reference symbol A, and the side surface of the chuck portion 30 comes into contact with the side surface 37 of the separator disk 18.

The chuck portion 30 moves along the ball screw 22, with a pressure imparted to the outer circumference surface of the holder 17, and allows one movable disk to move up to a predetermined disposition position set according to the width of a strip. In this instance, the plurality of movable disks move altogether at the same time in a direction indicated by the reference symbol A.

Movement along a position at which a movable disk is disposed, that is, along the ball screw 22 of the driving portion 26, is, as described above, controlled by the servomotor 25. Hereinafter, a description will be additionally given of motions of disposing a movable disk after the preparation step prior to change in disposition which has been described above. First, it is assumed that the controller is set so that a horizontal coordinate at a position of setting a movable disk is input through a panel. The chuck portion 30 and the arm 23 move along the thus input horizontal coordinate.

The arm 23 moves horizontally to the right-hand side shown in FIG. 2 (a direction indicated by the arrow of reference symbol A) from a state that the arm 23 has moved up to the left-side end of the ball screw 22 (the chuck portion 30 declines from a maximum expansion state and stops at a position of the first sensor). Then, when the arm 23 comes below a movable disk positioned at the leftmost side among the plurality of movable disks, the arm 23 stops the horizontal movement. A horizontal movement to the position concerned is controlled by the horizontal coordinate which has been set.

Then, at a position at which the horizontal movement is stopped, the chuck portion 30 rises and the chuck portion stops expansion at a position in contact with the outer circumference surface of the holder 17. This position is a height position which is detected by the above-described second sensor and the chuck portion 30 stops rising.

The chuck portion 30 comes into contact with the outer circumference surface of the holder 17, and while keeping a state in which the holder is being pushed upward, the arm 23 moves to the right-hand side in the horizontal direction (a direction indicated by the arrow of reference symbol A). The horizontal movement of the arm 23 is controlled by the horizontal coordinate which has been set, and the horizontal movement is stopped when a movable disk in contact therewith comes to a position at which it is to be disposed. Then, the chuck portion 30 declines and stops at a position of the first sensor. The above-described motions are conducted repeatedly, thereby completing disposition of a plurality of movable disks.

In the present disposing device 13, the chuck portion 30 imparts a contact pressure to the outer circumference surface of the holder 17, filling a clearance between the inner circumference surface of the holder 17 and the outer circumference surface of the expansion/contraction shaft 16, thereby allowing a movable disk to move smoothly. Further, on movement, the roller 35 rotates, reducing friction between the chuck portion 30 and the outer circumference surface of the holder 17, thereby allowing a movable disk to move more smoothly.

In the disposing device of shaft-body insertion objects according to the present invention, a movable disk is allowed to move by being pressed, irrespective of a load point of the movable disk. Thus, the arm can be made short in expansion/contraction stroke.

As a result, it is possible to downsize the disposing device. As described above, the separator disposing portion 15 can be installed, for example, below the separator 14. Thus, an operator finds it easy to visually confirm strips which are threaded in a slitter line. Further, the arm is shorter in expansion/contraction stroke, thus making it possible to shorten the time necessary for disposition work.

Further, the disposing device can be used without restriction on the size of a holder or a separator disk, thereby bringing about a variety of applications. Furthermore, since a movable disk can be disposed stably, the device and members are improved in maintenance performance.

Still further, in the above description, mainly described was the device dealing with movable disks of a separator. The disposing device of shaft-body insertion objects according to the present invention is also applicable to disposition of blades of slitters on a shaft. In this instance, the disposing device allows a round blade to move by pushing the round blade fixed on a holder which is attached on a hydraulic expansion/contraction shaft. Fundamental motions are similar to those of the movable disk of a separator.

As described above, the disposing device of shaft-body insertion objects according to the present invention is able to dispose at a desired position of a shaft body efficiently and stably shaft-body insertion objects such as a movable disk of a separator and a blade of a slitter used in a slitter line and also excellent in attachability in the slitter line.

DESCRIPTION OF THE REFERENCE SYMBOLS

1: Slitter line
2: Uncoiler
3: Slitter
4: Winding tension imparting device
5: Recoiler
8: Loop
11: Separator
12: Strip
13: Disposing device
14: Separator
15: Separator disposing portion
16: Expansion/contraction shaft
17: Holder
18: Separator disk
19: Rotary joint
20: Supporting portion
21: Supporting base
22: Ball screw 23: Arm
24: Shaft bearing
25: Servomotor
26: Driving portion
27: Chuck pedestal
28: Air cylinder
29: Piston
30: Chuck portion
31: Fitting groove
32: Both side surfaces of chuck portion
33: Position in contact with holder
34: Approximately V-letter shape
35: Roller
36: Position in contact with holder
37: Side surface of separator disk
38: Compressed air inlet
39: Groove
40: Long lug
41: Fluid conduction path
42: Fluid inlet
43: End side
44: Central side
45: Chuck portion
46: Tapered portion
47: Chuck portion
48: Part of end surface of chuck portion
49: Stopper

What is claimed is:

1. A disposing device of shaft-body insertion objects comprising:
an expansion/contraction shaft which is disposed at a predetermined position in a slitter line of a metal strip and formed in a tubular shape, having an outer circumference surface which is constituted so as to expand and contract freely on a cross section when viewed in a longitudinal direction;
a holder which has an inner circumference which is fitted outside the outer circumference surface of the expansion/contraction shaft;
a ring member which is formed with an approximately doughnut-shaped thin plate and integrated with the holder;
a driving portion which is capable of moving approximately in parallel along the expansion/contraction shaft;
a chuck pedestal attached to the driving portion, the chuck pedestal being disposed on a side of the driving portion facing the expansion/contraction shaft and being connected to a cylinder;
a piston which is formed in a rod shape, with one end thereof being connected to the cylinder and the other end thereof being constituted so as to expand towards and contract from a side of the expansion/contraction shaft;
a chuck base which is fitted to the chuck pedestal and also is fixed, on one side, to the other end of the piston; and
a chuck tip which is installed on the other side of the chuck base opposite from the piston and also in contact with an outer circumference surface of the holder in association with expansion of the piston, having a cross section which is formed in a recessed manner when viewed from a shaft center direction of the expansion/contraction shaft,
wherein the chuck pedestal comprises a groove portion having a pair of opposing inner surfaces that are at least partially in contact with corresponding opposing sides of the chuck base.

2. The disposing device of shaft-body insertion objects according to claim 1 which is constituted so that a contact pressure imparted to the outer circumference surface of the holder can be controlled when the chuck tip comes into contact with the outer circumference surface of the holder.

3. The disposing device of shaft-body insertion objects according to claim 2, wherein the chuck base and the chuck tip move in association with expansion and contraction of the piston, while at least the chuck base slides along the groove portion on the chuck pedestal.

4. The disposing device of shaft-body insertion objects according to claim 3, wherein the chuck base and the chuck tip move within a range of the groove portion on the chuck pedestal.

5. The disposing device of shaft-body insertion objects according to claim 2, wherein a region of the chuck tip which is in contact with the outer circumference surface of the holder is formed with a material low in frictional properties.

6. The disposing device of shaft-body insertion objects according to claim 2, wherein the ring member is an approximately doughnut-shaped separator disk and positioned between adjacent metal strips formed by the ring member, which adjacent metal strips are threaded in the slitter line, and the expansion/contraction shaft is installed after a loop, before and after a winding-tension imparting device and before a recoiler in the slitter line.

7. The disposing device of shaft-body insertion objects according to claim 2, wherein the ring member is an approximately doughnut-shaped blade, cutting a sheet-like metal plate into a metal strip, and the expansion/contraction shaft is installed on a cutter stand in the slitter line.

8. The disposing device of shaft-body insertion objects according to claim 1, wherein a region of the chuck tip which is in contact with the outer circumference surface of the holder is formed with a material low in frictional properties.

9. The disposing device of shaft-body insertion objects according to claim 1, wherein the chuck tip is formed so as to give a tapered portion which is decreased in thickness in a direction opposite to the chuck base on a cross section when viewed in a direction orthogonal to the shaft center direction of the expansion/contraction shaft.

10. The disposing device of shaft-body insertion objects according to claim 1, wherein the ring member is an approximately doughnut-shaped separator disk and positioned between adjacent metal strips formed by the ring member, which adjacent metal strips are threaded in the slitter line, and the expansion/contraction shaft is installed after a loop, before and after a winding-tension imparting device and before a recoiler in the slitter line.

11. The disposing device of shaft-body insertion objects according to claim 1, wherein the ring member is an approximately doughnut-shaped blade, cutting a sheet-like metal plate into a metal strip, and the expansion/contraction shaft is installed on a cutter stand in the slitter line.

12. The disposing device of shaft-body insertion objects according to claim 1, wherein the chuck tip is provided at a position in contact with the outer circumference surface of the holder with a roller portion which is attached so as to rotate freely along a direction at which the driving portion moves.

13. A disposing device of shaft-body insertion objects, comprising:
an expansion/contraction shaft which is disposed at a predetermined position in a slitter line of a metal strip and formed in a tubular shape, having an outer circumference surface which is constituted so as to expand and contract freely on a cross section when viewed in a longitudinal direction;

a holder which has an inner circumference which is fitted outside the outer circumference surface of the expansion/contraction shaft;

a ring member which is formed with an approximately doughnut-shaped thin plate and integrated with the holder;

a driving portion which is capable of moving approximately in parallel along the expansion/contraction shaft;

a chuck pedestal attached to the driving portion, the chuck pedestal being disposed on a side of the driving portion facing the expansion/contraction shaft, the chuck pedestal and being connected to a cylinder;

a piston which is formed in a rod shape, with one end thereof being connected to the cylinder and the other end thereof being constituted so as to expand towards and contract from a side of the expansion/contraction shaft;

a chuck base which is fitted to the chuck pedestal and also is fixed, on one side, to the other end of the piston; and a chuck tip which is installed on the other side of the chuck base opposite from the piston and also in contact with an outer circumference surface of the holder in association with expansion of the piston, having a cross section which is formed in a recessed manner when viewed from a shaft center direction of the expansion/contraction shaft, wherein the chuck tip is provided at a position in contact with the outer circumference surface of the holder with a roller portion which is attached so as to rotate freely along a direction at which the driving portion moves.

14. A disposing device of shaft-body insertion objects comprising:

a driving portion which is capable of moving substantially in parallel along an expansion/contraction shaft which is disposed at a predetermined position in a slitter line of metal strips and able to fix a holder formed integrally with a ring member;

a chuck pedestal attached to the driving portion, the chuck pedestal being disposed on a side of the driving portion facing the expansion/contraction shaft and being connected to a cylinder;

a piston which is formed in a rod shape, with one end thereof being connected to the cylinder and the other end thereof being constituted so as to expand towards and contract from a side of the expansion/contraction shaft;

a chuck base which is fitted to the chuck pedestal and also fixed, on one side, to the other end of the piston; and a chuck tip which is installed on the other side of the chuck base opposite from the piston and also in contact with an outer circumference surface of the holder in association with expansion and contraction of the piston, having a cross section formed in a recessed manner when viewed from a shaft center direction of the expansion/contraction shaft, wherein the chuck pedestal comprises a groove portion having a pair of opposing inner surfaces that are at least partially in contact with corresponding opposing sides of the chuck base.

15. A disposing device of shaft-body insertion objects, comprising:

an expansion/contraction shaft which is disposed at a predetermined position in a slitter line of a metal strip and formed in a tubular shape, having an outer circumference surface which is constituted so as to expand and contract freely on a cross section when viewed in a longitudinal direction;

a holder which has an inner circumference which is fitted outside the outer circumference surface of the expansion/contraction shaft;

a ring member which is formed with an approximately doughnut-shaped thin plate and integrated with the holder;

a driving portion which is capable of moving approximately in parallel along the expansion/contraction shaft;

a chuck pedestal attached to the driving portion, the chuck pedestal being disposed on a side of the driving portion facing the expansion/contraction shaft and being connected to a cylinder;

a piston which is formed in a rod shape, with one end thereof being connected to the cylinder and the other end thereof being constituted so as to expand towards and contract from a side of the expansion/contraction shaft;

a chuck base which is fitted to the chuck pedestal and also is fixed, on one side, to the other end of the piston; and a chuck tip which is installed on the other side of the chuck base opposite from the piston and also in contact with an outer circumference surface of the holder in association with expansion of the piston, having a cross section which is formed in a recessed manner when viewed from a shaft center direction of the expansion/contraction shaft, wherein the chuck tip is formed so as to give a tapered portion which is decreased in thickness in a direction opposite to the chuck base on a cross section when viewed in a direction orthogonal to the shaft center direction of the expansion/contraction shaft.

* * * * *